US012791792B2

(12) United States Patent
Ryan et al.

(10) Patent No.: US 12,791,792 B2
(45) Date of Patent: Nov. 10, 2026

(54) DEVICE FABRICATION METHODS WITH ION BEAM PROCESSING

(71) Applicant: Tokyo Electron Limited, Tokyo (JP)

(72) Inventors: Kevin Ryan, Albany, NY (US); Chimaobi Mbanaso, Chaska, MN (US)

(73) Assignee: Tokyo Electron Limited, Tokyo (JP)

( * ) Notice: Subject to any disclaimer, the term of this patent is extended or adjusted under 35 U.S.C. 154(b) by 261 days.

(21) Appl. No.: 18/410,811

(22) Filed: Jan. 11, 2024

(65) Prior Publication Data

US 2025/0231342 A1 Jul. 17, 2025

(51) Int. Cl.
*G02B 6/13* (2006.01)
*G02B 6/136* (2006.01)
*G02B 6/12* (2006.01)

(52) U.S. Cl.
CPC ............ *G02B 6/136* (2013.01); *G02B 6/131* (2013.01); *G02B 2006/12183* (2013.01); *G02B 2006/12197* (2013.01)

(58) Field of Classification Search
CPC .................... G02B 6/136; G02B 6/131; G02B 2006/12183; G02B 2006/12197; G02B 6/12004; G02B 6/43; G02B 2006/12061; G02B 6/12002
USPC ........................................................... 216/94
See application file for complete search history.

(56) References Cited

U.S. PATENT DOCUMENTS

| | | | | |
|---|---|---|---|---|
| 9,360,623 | B2 | 6/2016 | Bowers et al. | |
| 9,666,566 | B1 | 5/2017 | Chen et al. | |
| 11,133,645 | B2 | 9/2021 | Bovington et al. | |
| 2012/0288995 | A1 | 11/2012 | El-Ghoroury | |
| 2019/0326252 | A1* | 10/2019 | Mandalapu | H10P 54/00 |
| 2022/0252913 | A1* | 8/2022 | Lo | G02F 1/025 |
| 2023/0092821 | A1* | 3/2023 | Karhade | G02B 6/421 385/14 |
| 2023/0420432 | A1* | 12/2023 | Suthram | H10W 74/129 |

FOREIGN PATENT DOCUMENTS

| | | | | |
|---|---|---|---|---|
| CN | 108232010 A | | 6/2018 | |
| WO | WO-2008054014 A1 | * | 5/2008 | H10P 50/00 |

OTHER PUBLICATIONS

PCT International Search Report and Written Opinion, PCT Application No. PCT/US2024/047599, mailed Dec. 20, 2024, 11 pages.

(Continued)

*Primary Examiner* — Duy Vu N Deo
(74) *Attorney, Agent, or Firm* — Slater Matsil, LLP

(57) ABSTRACT

A method for fabricating a photonic integrated circuit (PIC), where the method includes providing a first PIC die including a first optical component covered by a first dielectric layer; performing a location specific ion beam planarizing of the first dielectric layer to form a first planarized surface; providing a second PIC die including a second optical component covered by a second dielectric layer; performing a planarizing of the second dielectric layer to form a second planarized surface; and bonding the first planarized surface of the first PIC die to the second planarized surface of the second PIC die to form a three dimensional (3D) stacked PIC die.

24 Claims, 10 Drawing Sheets

(56) References Cited

OTHER PUBLICATIONS

Eibelhuber, M, et al., "Advanced bonding techniques for photonic integrated circuits," CS MANTECH Conference, May 19-22, 2014, Denver, Colorado, USA, 4 pages.
Knights, Andrew P. et al., "Silicon Photonics-Recent Advances in Device Development," Jan. 2008, In book: Advances in Information Optics and Photonics (pp. 633-656), Publisher: SPIE Press.
Komljenovic, T., et al., "Photonic Integrated Circuits Using Heterogeneous Integration on Silicon," in Proceedings of the IEEE, vol. 106, No. 12, pp. 2246-2257, Dec. 2018, 2 pages.
Roelkens, G., "III-V/Si photonics by die-to-wafer bonding," Materials Today, vol. 10, Issues 7-8, Jul.-Aug. 2007, pp. 36-43, ISSN 1369-7021.

* cited by examiner

DEVICE FABRICATION METHODS WITH ION BEAM PROCESSING

TECHNICAL FIELD

The present invention relates generally to methods for device fabrication, and, in particular embodiments, a methods for device fabrication with ion beam processing.

BACKGROUND

Semiconductor devices, viz., integrated circuit (IC) devices, are used ubiquitously for various applications such as computers, data communication, medical imaging, missile systems, and mobile phones. Several broad categories of semiconductor devices include electrical ICs (e.g., digital memory, digital logic, and analog amplifiers), photonic integrated circuits (PICs) comprising light emitting diode (LED), laser, solar cell, optical amplifier, waveguide, optical coupler, and the like, and micro electro-mechanical systems (MEMS) that have movable parts for applications such as RF resonators, accelerometers, and digital mirror devices (DMD) used in projectors. In order to increase its functionality, diverse components, like digital logic and solar cells may be included in a PIC to form an optoelectronic PIC. However, if the materials are incompatible or the process complexity of integration is not cost effective then several devices may be stacked using a three-dimensional (3D) IC approach to form a semiconductor device, referred to as 3D stacked IC, where at least two devices (e.g., two PICs) are stacked and coupled to form a 3D stacked IC. Two ICs may be stacked using a wafer-to-wafer (W2W), die-to-wafer (D2W), or die-to-die (D2D) bonding that includes performing an alignment and a bonding process. A 3D stacked IC may replace a more complex heterogeneous integration method. For example, an InP laser diode in one PIC may be stacked over a silicon waveguide in another PIC, thus avoiding complex heteroepitaxy. However, manufacturing 3D stacked ICs has its own challenges. Thus, further innovations in fabricating 3D stacked ICs are desired.

SUMMARY

A method for fabricating a photonic integrated circuit (PIC), where the method includes providing a first PIC die including a first optical component covered by a first dielectric layer; performing a location specific ion beam planarizing of the first dielectric layer to form a first planarized surface; providing a second PIC die including a second optical component covered by a second dielectric layer; performing a planarizing of the second dielectric layer to form a second planarized surface; and bonding the first planarized surface of the first PIC die to the second planarized surface of the second PIC die to form a three dimensional (3D) stacked PIC die.

A method of fabricating a photonic integrated circuit (PIC), where the method includes providing a first die and a second die, the first die being larger than the second die; locally planarizing a portion of a major surface of the first die with an ion beam to form a planarized surface, the locally planarizing including scanning the portion of the major surface relative to the ion beam; and bonding the planarized surface of the first die with a major surface of the second die.

A method of fabricating an integrated circuit (IC), where the method includes providing a first die and a second die, the first die being larger than the second die; performing a location specific ion beam process to form a recess into a major surface of the first die, the performing including scanning a portion of the major surface relative to the ion beam to form the recess having a planarized bottom surface; and attaching the second die to the planarized bottom surface of the recess.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
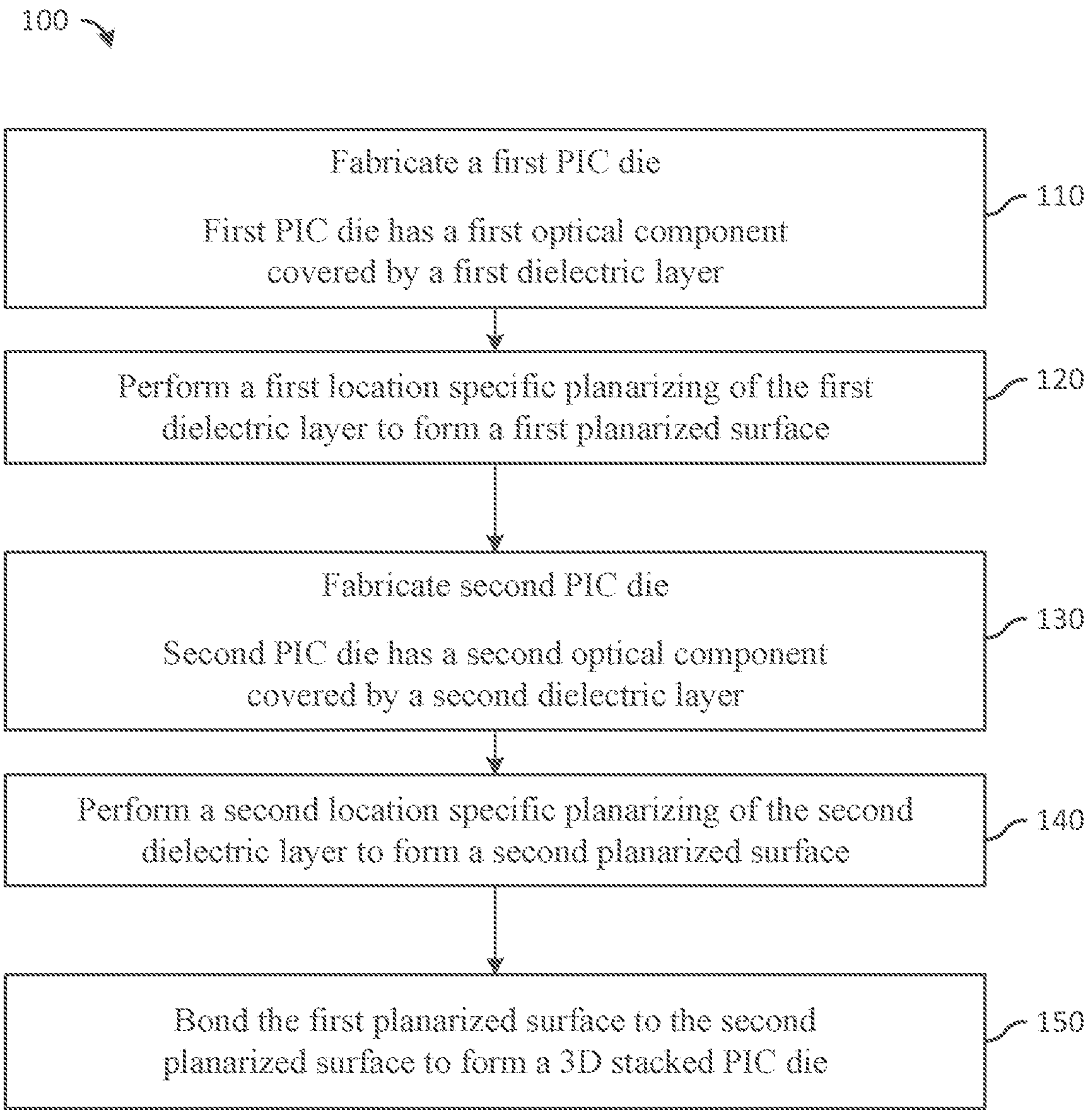
FIG. 1 illustrates a flowchart of a method for fabricating a photonic integrated circuit (PIC), in accordance with an embodiment of the invention.

This disclosure describes embodiments of methods to fabricate a photonic IC (PIC), where the PIC is a 3D stacked IC. In contrast to 3D packaging, the 3D stacked IC is formed by stacking individual IC devices prior to coupling a packaging component (e.g., a bond wire, solder bump, or a redistribution layer (RDL)) to any of the individual IC devices. A stack of the 3D stacked IC comprises two individual IC devices coupled together by couplers that may be electrical, optical, or electro-mechanical couplers, or a combination of the same. If any of the devices is a PIC then the 3D stacked IC is referred to as a 3D stacked PIC. In general, one 3D stacked IC may have multiple stacks.

An example of an electrical coupler is a pair of through silicon vias (TSVs) in physical contact, and an example of an optical coupler may be a pair of dielectric waveguides positioned in close proximity to each other for evanescent coupling. An electro-mechanical coupler may be a transducer that converts electromagnetic (EM) energy to mechanical energy (or vice versa). For example, in a surface acoustic wave (SAW) delay line (a MEMS device built in a piezoelectric material) may use an interdigitated transducer (IDT) at the input end of the delay line. The IDT is a periodic pattern of interdigitated metal lines formed on a surface of the piezoelectric material. When coupled to an electrical signal, the IDT may launch an acoustic wave on the surface, i.e., the IDT utilizes the piezoelectric effect to convert EM energy of the electrical signal to mechanical energy of the SAW. A delayed electrical signal may be output by another IDT at an opposite end of the delay line.

Typically, the individual IC of the stack is a die in an array of dies fabricated in a semiconductor wafer. The stack may be formed by bonding a planarized surface of a first device (e.g., a PIC or an electrical IC) to a planarized surface of a second device. In the embodiments of methods to fabricate a 3D stacked PIC, the planarized surfaces are formed using process flows that include gas cluster ion beam (GCIB) planarization performed in a GCIB etcher. When a wafer is exposed to GCIB, the topography of its surface may be modified physically by clusters impacting the surface. Generally, inert clusters formed with a gas such as argon is used for physically removing material from the surface. The surface may also be modified chemically by using chemically reactive clusters. Thus, GCIB etching may have a chemical component, where the chemically active species in the clusters react with the surface material to form volatile byproducts.

As described in further detail below, GCIB planarization utilizes a location specific processing (LSP) capability of the GCIB etcher to dynamically adjust a material removal rate while the wafer is being scanned through the ion beam along a scan trajectory. A process is said to be utilizing LSP if the value of a controllable process parameter at any location on the surface of the wafer is selected according to the x-y coordinates of that location. For example, parameters such as scan rate, beam current etc. of an ion beam process may be varied depending on the location where the beam intersects the wafer.

A location specific GCIB process (also referred to as GCIB-LSP in this disclosure) may be configured to perform various functions in various embodiments described in this disclosure. In some embodiments, GCIB-LSP may be configured to planarize an entire major surface of a wafer. In some embodiments, GCIB-LSP may be configured for local planarizing, where the scan trajectory covers only a portion of the wafer surface, i.e., the scan trajectory may exclude portions of the surface that do not require to be exposed to the ion beam, thus reducing processing time. In some embodiments, in addition to planarization, the GCIB etcher may be configured to perform other functions such as vertical etching to form a recess and lateral etching for linewidth adjustment. In some embodiments, the various functions may be performed locally on different regions of the wafer. In some other embodiments, different functions may be performed at the same location. For example, in some embodiment, the surface may be recessed locally and planarized to form a recessed planarized surface.

After preparing the planarized surfaces of the first device and the second device of the stack, the processing may proceed to execute the steps in the process flow that are for bonding the two planarized surfaces in order to stack a pair of semiconductor devices in a 3D stacked PIC device. In general, the bonding may be wafer-to-wafer (W2W), die-to-wafer (D2W), or die-to-die (D2D) bonding. The planarized surfaces may be prepared during the wafer fabrication process (i.e., prior to singulation). In some embodiments using D2W or D2D bonding, the planarized surface of a die may be prepared for bonding after singulation by scanning the surface of the singulated die through the planarizing beam.

The bonding process couples the first device to the second device by forming the couplers that have been designed to transmit and receive signals, power supply, and reference voltages between the first device and the second device. By including GCIB planarization, embodiments of the methods described herein provide an advantage of achieving tight control of total thickness variation (TTV). In various embodiments, the TTV may be in a range of about 0.5 nm to 2 nm after GCIB planarization. In addition, the dynamically adjustable removal rate of the GCIB-LSP technique allows the thickness to be modulated in certain areas, if desired.

While the embodiments in this disclosure will be described with respect to GCIB, the embodiments are applicable to any location specific ion beam technique that can planarize a surface. Examples of such techniques include Focused Ion Beam (FIB) and Reactive Ion Beam Etching (RIBE). Accordingly, an ion beam etcher as used in various embodiments of this application may be a GCIB tool used for etching, i.e., a GCIB etcher, a FIB tool, or an RIBE tool in various embodiments.

FIG. 1 illustrates a flowchart of a method 100 that follows the approach outlined above to fabricate a PIC, where each PIC die is a 3D stacked PIC die. The method 100, summarized by the flowchart in FIG. 1, may be applied to fabricate a PIC comprising a stack of a first PIC die and a second PIC die. As indicated in box 110 of the flowchart for method 100, a first PIC die is fabricated with a suitable fabrication process flow. For example, a first wafer may be processed through a sequence of patterning levels to fabricate a plurality of first PIC dies. A cross-sectional view of a portion of one first PIC die 200 is illustrated schematically in FIG. 2. A second PIC die 300 to be stacked with the first PIC die 200 is described with reference to the cross-sectional view in FIGS. 3A-3C. An example 3D stacked PIC die 400 formed by stacking the first PIC die 200 with the second PIC die 300 is described with reference to FIGS. 4A-4B.

Figure 2:
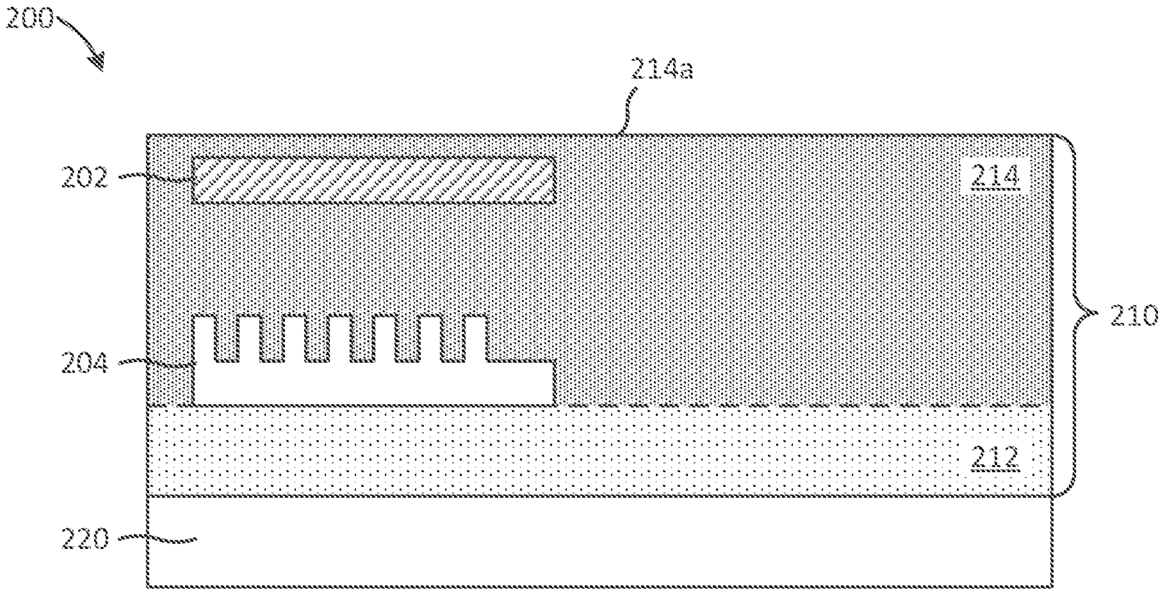
FIG. 2 illustrates a schematic cross-sectional view of a PIC, in accordance with an embodiment of the invention.

Each first PIC die 200 includes a first optical component, for example, a first waveguide 202 that has been selected to be one part of an optical coupler to couple optical signals between the first PIC die 200 and the second PIC die 300, as explained in further detail below. As illustrated in FIG. 2, the first waveguide 202 is covered by a first dielectric layer 210. As explained in further detail below, the first dielectric layer 210 may be a combination of various insulating layers deposited during processing the first wafer or included in the starting material for the first wafer.

A region where the light wave is confined in a waveguide is commonly referred to as a core of the waveguide. For confinement by total internal reflection (TIR), a refractive index of the core has to be greater than that of any dielectric material adjacent to the core. As known to persons skilled in the art, while the light is confined in the core of the waveguide, there is typically an evanescent EM field in the neighboring lower refractive index dielectric material adjacent to the core, referred to as a cladding of the waveguide. Since the first waveguide 202 is a planar waveguide that confines the light wave by TIR, the first waveguide 202 comprises an optical material having a higher refractive index than that of the material of the first dielectric layer 210 adjacent to the first waveguide 202. For example, if the dielectric material adjacent to the first waveguide 202 comprises silicon oxide then, in various embodiments, the first waveguide 202 may comprise high resistivity (HR) silicon (also referred to as undoped silicon), silicon nitride, or silicon oxynitride.

The example cross-sectional view of the first PIC die 200 illustrated in FIG. 2 shows two optical components. In general, an optical component may be an active optoelectronic component or a passive optical component. A passive optical component may be, for example, a waveguide, coupler, isolator, filter, and phase shifter. In FIG. 2, a grating coupler 204 is shown disposed in a lower tier, while the first waveguide 202 is seen in an upper tier. In various embodiments, the first PIC die 200 may include various numbers of tiers of components. Each tier may be formed by processing the first wafer through a sequence of patterning levels comprising, for example, deposition and patterning steps. The process flow for fabricating the first PIC dies in the first wafer may further include forming optoelectronic and electronic components as well as electrical interconnect elements. An example of an optoelectronic component may be a laser, LED, optical switch, photodetector, and photomultiplier. Electronic components may include resistor, capacitor, and transistor. Electrical interconnect elements such as metal lines, contacts, vias, and TSVs may be connecting electrical signals and power supplies during operation.

The layers of an insulating matrix of the first wafer are collectively referred to as the first dielectric layer 210. The insulating matrix is the insulator encasing the components in the various tiers and the electrical interconnect elements. Thus, the dielectric layers of the first dielectric layer 210 may have been formed at different patterning levels or included in the starting material for the first wafer. In the example illustrated in FIG. 2, the starting material for the first wafer is a silicon-on-insulator (SOI) wafer having a silicon substrate 220, an epitaxially grown silicon layer, and a buried oxide (BOX) layer 212 comprising silicon oxide formed below the epitaxial silicon layer. Note that, in FIG. 2, the epitaxially grown silicon layer of the SOI wafer has been patterned to form the grating coupler 204 and covered by an insulating cover layer. This cover layer may be covering all the components in this tier and referred to as the first cover layer. An optical material may be deposited and patterned at a subsequent patterning level to form the first waveguide 202, which is then covered by a second cover layer. The various cover layers, as well as other insulating layers filling a space between adjacent components and electrical interconnect elements, are collectively referred to as an isolation layer 214. As illustrated in FIG. 2, the BOX layer 212 of the starting SOI wafer and the isolation layer 214 (comprising deposited layers) are both part of the insulating matrix, hence part of the first dielectric layer 210 of the first wafer. It is noted that the first dielectric layer 210 of the first PIC die 200 extends across the entire first wafer.

The use of SOI wafers as the starting material is not intended to be construed in a limiting sense. Persons skilled in the art will be able to make various modifications to implement the inventive aspects of the example embodiments with a different starting material, for example, a bulk semiconductor material.

In some embodiment, the optical material for the first waveguide 202 may comprise silicon nitride and the material for the first and second cover layers may comprise silicon oxide. The various layers in the isolation layer 214 may be formed, by depositing, for example, silicon oxide using a suitable deposition technique, such as low pressure chemical vapor deposition (LPCVD), plasma-enhanced chemical vapor deposition (PECVD), and high density plasma chemical vapor deposition (HDP-CVD).

As indicated in box 120 of the flowchart in FIG. 1, the method 100 includes planarizing a surface of the first dielectric layer 210 using the LSP technique. The planarization, referred to as first location specific planarization, is in preparation for a bonding process that is used subsequently to fabricate a bonded assembly, which is a 3D stacked PIC die 400, described further below with reference to FIG. 4. In this example, it is assumed that the bonding process is W2W bonding resulting in a bonded wafer comprising a plurality of 3D stacked PIC dies 400. In some other embodiments, the method of forming the 3D stacked PIC die 400 may be modified to be suitable for D2W or D2D bonding.

The bonding occurs between the planarized surface of the first dielectric layer 210 of the first PIC die 200 (referred to as a first planarized surface 214*a*) with a planarized surface of the second PIC die 300 (referred to as a second planarized surface 312*a*, described with reference to FIG. 3C). As explained in further detail below, the bonding results in forming an optical coupler. A portion of the first waveguide 202 in the first PIC die 200 has been selected to be one part of the optical coupler that gets coupled to another part of the optical coupler, which is disposed in the second PIC die 300. As described above, the first dielectric layer 210 covers the first waveguide 202 in each of the first PIC dies 200. Hence, the surface to be planarized to prepare the first planarized surface 214*a* is a surface of the first dielectric layer 210. In the example first PIC die 200, a surface of the isolation layer 214 prior to planarization is the appropriate surface of the first dielectric layer 210 for planarization and, as illustrated in FIG. 2, has been planarized to be the first planarized surface 214*a*.

As mentioned above, in the embodiments described in this disclosure, the planarized surfaces (e.g., the first planarized surface 214*a*) are prepared with GCIB planarization processes that may achieve a smooth surface and TTV less than 2 nm using a GCIB etch process that implements a location specific processing (LSP) technique. In some embodiments the method 100 further includes a touchup wet chemical etch or chemical mechanical polish (CMP) performed after the GCIB planarization to remove a damage layer formed on the surface during the GCIB planarization. The surface, after the removing the damage layer, is then the planarized surface prepared for bonding (e.g., the first planarized surface 214*a*).

GCIB processing is a technique for controllable processing of a surface by exposing a location of the surface to a collimated beam of high energy clusters of charged gas molecules. The GCIB processes described in this disclosure may be performed with the workpiece (e.g., the first die or the second die) held in a GCIB processing chamber coupled to a GCIB source and a scanner. In this example embodiment, the GCIB processing is done using a wafer (e.g., the first wafer or the second wafer) as the workpiece. In some other embodiments, the method may be modified such that the GCIB processing to prepare the dies for bonding occurs after singulation.

After being loaded in the GCIB processing chamber, a surface of the wafer is exposed to a GCIB beam from the GCIB source. The scanner moves the wafer through the beam along a scan trajectory, with the wafer held at a variable tilt angle relative to the beam and a twist angle relative to a wafer orientation (often indicated by a wafer notch). A set of GCIB process control parameters may be controlled by, for example, a programmable electronic controller. In a GCIB-LSP process, the respective set of process parameters (i.e., values of the control parameters) depends on the beam location, defined as the location on the wafer where the beam intercepts the scan trajectory. The control parameters may include spot size, beam current, total dose, beam energy, tilt angle, twist angle, scan rate, processing time, and dwell time. The dwell time is a total exposure time that depends on a product of the scan rate and the processing time.

The GCIB beam may comprise a plurality of clusters of various types of gas molecules, e.g., inert gases, such as Ar and $N_2$, reactant gases, such as, $O_2$, $CO_2$, $NH_3$, $NF_3$, $SF_6$, $CF_4$, $CHF_3$, and the like, or a mixture of both types. The size of each cluster may vary, e.g., from 1000 to 10,000 molecules, loosely bound by van der Waals forces in a condensate formed by adiabatic expansion of a gas. For example, clusters form when compressed gas at about $10^4$ Torr is released through a supersonic nozzle into a vacuum chamber at a pressure of about $10^{-2}$ Torr. The emanating jet of clusters may be ionized to about +1e to +10e per cluster (e is elementary charge) by colliding the clusters with energetic electrons in high vacuum (~$10^{-5}$ Torr) in an ionizer. Once charged, the clusters may be imparted high energy with an accelerating voltage of about 10 kV to about 60 kV. The energized clusters are collimated and directed by EM lenses to form a GCIB beam impinging on the surface with a spot size that is adjustable from a few microns to a few centimeters. In the embodiments of GCIB processes in this disclosure, the spot sizes may be about 0.2 cm to about 2 cm in diameter. Because of their low charge to mass ratio, the clusters strike the surface with a low velocity, disintegrate into individual particles on impact, which are stopped within about 10 nm to 15 nm of the surface, despite the high energy (10 keV to 60 keV) per cluster. Thus, GCIB processes may provide an advantage of close to ideal surface processing. Low velocity implies low beam current, which provides the advantages of avoiding undesirable surface charging and heating by keeping the average power to be about 1 W to about 10 W.

In the embodiments described in this disclosure, the planarized surfaces (e.g., the first planarized surface 214*a* in FIG. 2) are prepared with GCIB planarization processes that include a GCIB-LSP etch step. A GCIB etch process may be performed with a GCIB etcher comprising the GCIB processing chamber, GCIB source, scanner, and a programmable electronic controller. In any adaptive process, the process is dynamically altered during processing. The GCIB-LSP etch process is an example of an adaptive process, wherein an etch rate may be altered dynamically during processing, in accordance with the beam location as the wafer moves through the GCIB beam along a scan trajectory. Generally, in a GCIB etch process, the etch rate is roughly directly proportional to the scan rate (assuming that other control parameter values remain the same). In the example embodiments of the GCIB-LSP etch processes, the beam location dependent etch rates are implemented by having beam location dependent scan rates. It is understood that, in other embodiments, some other control parameter, e.g., beam current, total dose, spot size, etc., or a combination of several control parameters may be adjusted dynamically to implement a desired beam location dependent etch rate.

For specificity, the location specific GCIB planarizing technique is described below for the case where the workpiece is a wafer and the surface being planarized is a major surface of the wafer. However, the described adaptive approach of GCIB-LSP may be applied to some other workpiece, for example, an individual die.

In order to planarize a surface with GCIB planarization, the GCIB etch process has to remove unequal amount of material from different regions of the surface to be planarized, depending on the state of the wafer prior to planarization, as defined by a wafer map of some location dependent metric. Thus, to execute GCIB planarization, the executor has to first acquire the wafer map of the location dependent metric to determine the state of the wafer. In some embodiments, the location dependent metric is location dependent thickness data of the layer to be planarized. It is understood that, in some other embodiments, the location dependent metric may be some other metric, for example, a step height relative to a reference height. In general, a surface topography map of the region to be planarized is acquired and, based on that information, location dependent scan rates may be determined to achieve location dependent etch rates. For example, based on the wafer map of the thickness of the layer to be planarized, the GCIB etcher may be configured for performing the GCIB-LSP etch process with location dependent etch rates.

In some fabrication method, the layer to be planarized may have a non-planar surface because of a systematic nonuniformity of a deposition process that has been used to form the layer, e.g., a center-to-edge nonuniformity, where the deposited thickness reduces radially from the center of the wafer to the edge. If the non-planarity is due to such a higher deposition rate in the center then, to planarize the surface, the GCIB-LSP etch process needs to remove more material near the center, where the layer is thicker. Thus, it is desirable to configure the GCIB etcher to provide etch rates that correlate directly with the wafer map of the thickness of the layer to be planarized. As mentioned above, in this example GCIB-LSP etch process, the beam location dependent etch rate is implemented by having beam location dependent scan rate. Thus it is expected that the scan rates, calculated based on the wafer map, correlate directly with the respective location dependent thicknesses. The calculated scan rates may be used by the programmable electronic controller to configure the scanner to have the calculated location dependent scan rate. Thus configured, the wafer may be moved by the scanner along a selected scan trajectory while the scan rate is dynamically adjusted by the programmable electronic controller according to the calculated location specific scan rates. Hence, the GCIB etcher may planarize the surface of the layer to be planarized when the GCIB-LSP etch process is performed.

The scan rates may be calculated using, for example, a model relating the scan rate to the etch rate for the GCIB-LSP etch process. The model may be obtained a priori from process characterization data. The thicknesses for the wafer map may be compiled from thickness measurements done on each wafer being planarized by the GCIB-LSP etch process. In some embodiments, the wafer map may be compiled from a subset of a group of wafers, where each wafer of the group of wafers has been processed to be in a similar state prior to planarization.

As mentioned above, in box 120 of the flowchart in FIG. 1, the method 100 includes planarizing the first dielectric layer 210 by a first location specific planarization to form the first planarized surface 214*a* in FIG. 2. In executing the first location specific planarization of a wafer surface, a first wafer map of a thickness of the first dielectric layer 210 is compiled prior to planarization. The first wafer map may be used to configure the etcher to perform a location specific planarization, for example, configure the GCIB etcher to perform a GCIB-LSP etch process, which is referred to as a first process. It is noted that a die map would be used to configure the etcher if the workpiece is an individual die. Performing the first process may planarize the first dielectric layer 210. Thus, the first process may be a having a beam location dependent etch rate of the first dielectric layer 210, where the etch rate correlates directly with the respective thickness in the first wafer map, as explained above. Here, configuring the GCIB etcher to perform the first process is configuring the scanner of the GCIB etcher to have a beam location dependent scan rate, where the scan rate correlates directly with the respective thickness in the first wafer map to provide the desired beam location dependent etch rate of the first dielectric layer 210.

In some embodiments, there may be a damage layer (e.g., an amorphous damage layer) on the first wafer after the first GCIB planarization is complete. The damage layer on the first wafer may be removed by performing a first touchup etch, where the first touchup etch comprises a wet etch or a CMP process. In embodiments where the method 100 includes the first touchup etch, the surface after the damage layer is removed is the first planarized surface 214*a*.

It is understood that, in some embodiments, planarizing the first dielectric layer 210 may be achieved by a combination of planarization techniques. For example, a CMP step may be performed prior to executing the first GCIB planarization, described above.

Box 130 of the flowchart for method 100, illustrated in FIG. 1, indicates that the second PIC die 300 is fabricated with a suitable fabrication process flow. For example, a second wafer may be processed through a sequence of patterning levels to fabricate a plurality of second PIC dies 300. As mentioned above, the 3D stacked PIC die 400, formed by stacking the first PIC die 200 with the second PIC die 300, involves bonding two planarized surfaces using a bonding process. Since the bonding is between two planarized surfaces, a second planarized surface 312*a* (shown in FIG. 3C) has to be formed in the second PIC die 300 to bond with the first planarized surface 214*a* (shown in FIG. 2). Typically, if the two dies have the same form factor and the two wafers are of equal diameter then W2W bonding is preferred. An example structure of the second PIC die 300 and the fabrication steps in preparing the plurality of second PIC dies 300 in the second wafer for bonding (e.g., preparing the second planarized surface 312*a*) are described with reference to the cross-sectional views in FIGS. 3A-3C.

As mentioned above, in this example, it is assumed that W2W bonding is used to form the 3D stacked PIC die 400. Thus, it follows that, in the example described with reference to FIGS. 3A-3C, the second PIC die 300 is fabricated in a second wafer, different from the first wafer. In some other embodiment, a pair of dies from the same wafer may be bonded using D2D bonding to form a 3D stacked PIC die.

Figure 3A:
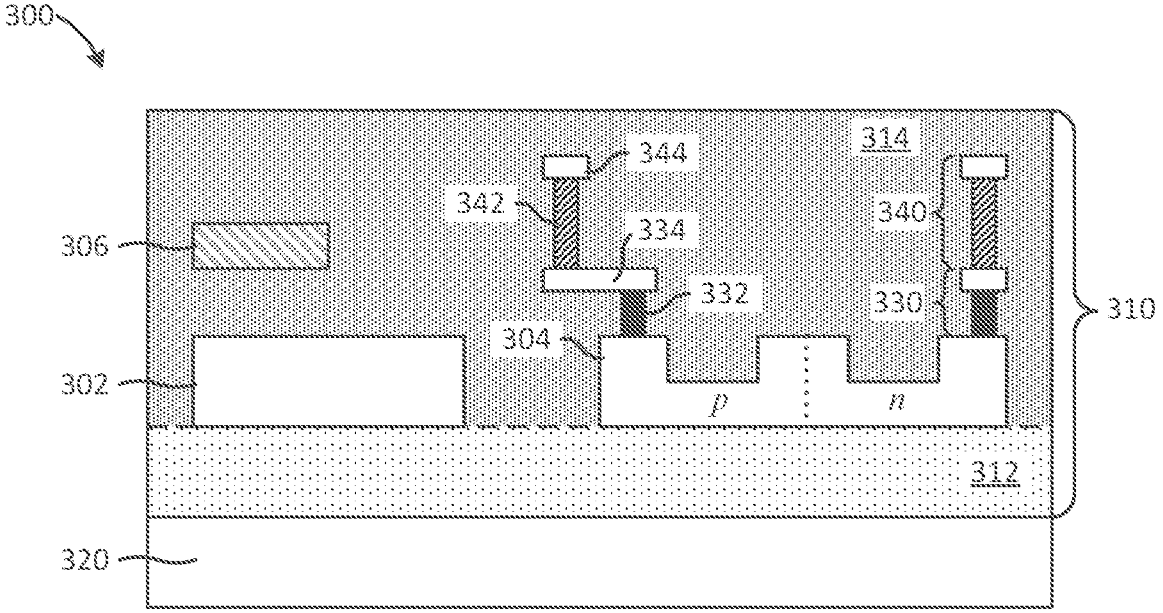
FIGS. 3A-3C illustrate various schematic cross-sectional views of a PIC at intermediate stages of fabrication, in accordance with an embodiment of the invention.

FIG. 3A illustrates schematically a cross-sectional view of a portion of one second PIC die 300. As indicated in box 130 of the method 100, each second PIC die 300 includes a second optical component, for example a second waveguide 302. Recall that the first waveguide 202 has been designated to be part of the optical coupler which, after bonding with the second PIC die 300, couples to another waveguide disposed in the second PIC die 300. In this example, the second waveguide 302 has been selected to be the other waveguide of the optical coupler. Similar to the starting material for the first wafer, the starting material for the second wafer is also an SOI wafer having a silicon substrate 320, an epitaxial silicon layer, and a buried oxide (BOX) layer 312 below the epitaxial silicon layer. In FIG. 3A, the epitaxially grown silicon layer of the SOI wafer has been patterned to form the second waveguide 302 and a p-n junction phase modulator 304. The second waveguide 302 and the p-n junction phase modulator 304 are components in a lower tier of the second PIC die 300. A third waveguide 306 comprising, for example, a different optical material is disposed in an upper tier of the second PIC die 300. In addition to the passive optical components (e.g., the second waveguide 302) and the optoelectronic components (e.g., the p-n junction phase modulator 304), the cross-sectional view of in FIG. 3A shows that the second PIC die 300 has two levels of metal comprising electrical interconnect elements formed above the epitaxial silicon layer. A first metal level 330 comprises contacts and metal lines (referred to as $metal_1$ lines), for example, a contact 332 connecting an anode of the p-n junction phase modulator 304 to a $metal_1$ line 334. A second interconnect level 340 comprises vias (referred to as $via_1$'s) and metal lines (referred to as $metal_2$ lines), for example, a $via_1$ 342 connecting the first $metal_1$ line 334 to a $metal_2$ line 344.

As illustrated in FIG. 3A, the components and electrical interconnect elements of the second PIC die 300 are covered by an isolation layer 314, similar to the isolation layer 214 of the first PIC die 200. A second dielectric layer 310 encases all the components and electrical interconnect elements of the second PIC die 300 in an insulating matrix. The second dielectric layer 310 comprises the isolation layer 314 and the BOX layer 312. This aspect of the second dielectric layer 310 of the second PIC die 300 is similar to that of the first dielectric layer 210 of the first PIC die 200, but, in various embodiments, the materials and thicknesses of the dielectric layers included in the second dielectric layer 310 may be different from those included in the first dielectric layer 210.

As indicated in box 140 of the flowchart in FIG. 1, the method 100 includes planarizing a surface of the second dielectric layer 310. The second waveguide 302, being formed in the epitaxially grown silicon layer of the SOI wafer, is adjacent to the BOX layer 312 of the second dielectric layer 310. As explained above, the surface to be planarized for bonding is a surface of the insulating matrix. The insulating matrix for the first PIC die 200 is the first dielectric layer 210, and the insulating matrix for the second PIC die 300 is the second dielectric layer 310. Recall that, for the first PIC die 200, the surface to be planarized was that of the isolation layer 214 of the first dielectric layer 210 because the first waveguide 202 (one part of the optical coupler) was in the upper tier. However, the second waveguide 302 (the other part of the optical coupler) is in the lower tier. As mentioned above, the second waveguide 302 is adjacent to the BOX layer 312 of the second dielectric layer 310. Hence, the surface to be planarized is a surface of the BOX layer 312 opposite an interface between the BOX layer 312 and the second waveguide 302. It is apparent from the cross-sectional view in FIG. 3A that the silicon substrate 320 has to be removed in order to access the BOX layer 312 for planarization.

Figure 3B:
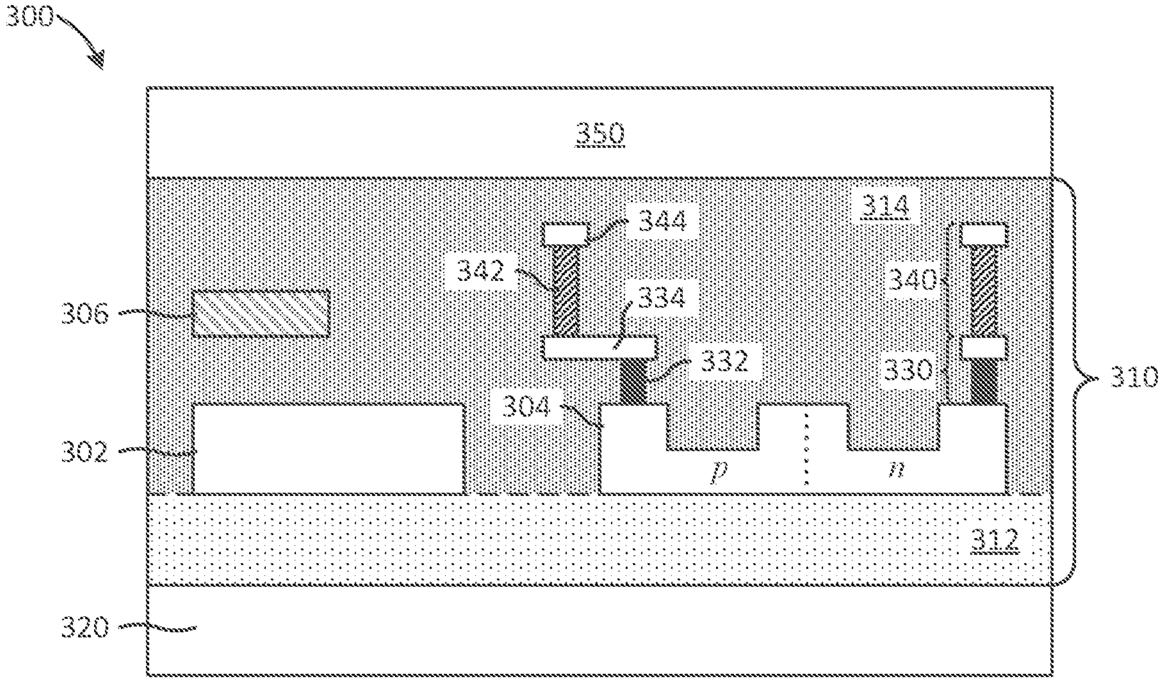

It is noted that BOX layers are generally highly planar with low TTV. However, the initial BOX layer 312 (as seen in FIG. 3A and FIG. 3B) may be too thick for a desired strong evanescent coupling between the first waveguide 202 and the second waveguide 302. Thus, even if an exposed surface of the BOX layer 312 (exposed by removal of the silicon substrate 320) is sufficiently smooth for the bonding process, a planarizing etch process may be needed to provide a thinner BOX layer 312 with a tightly controlled thickness (i.e., low TTV). In some embodiments, the planarizing etch process may be a GCIB etch process. In some other embodiment, where the starting surface is smooth, some other planarization technique (e.g., CMP) may be used. If, in some embodiment, the initial thickness of the BOX layer 312 is appropriate for evanescent coupling, or if evanescent coupling is not needed then planarization of the BOX layer 312 may be omitted.

It is further noted that, in the example embodiment (described with reference to FIGS. 1-4B), the bonding occurs between one surface (the first planarized surface 214*a*) prepared by planarizing a typically conformally deposited oxide layer (the isolation layer 214) and another surface (the second planarized surface 312*a* in FIG. 3C) prepared by planarizing a typically more planar oxide layer (the BOX layer 312). In some other embodiment, both the surfaces may be surfaces of conformally deposited dielectric layers, hence both the surfaces need to be prepared by a planarization process such as the location specific GCIB planarization process.

In FIG. 3B, a temporary carrier wafer 350 is bonded to a surface of the isolation layer 314 on a side of the isolation layer 314 opposite its interface with the BOX layer 312. A purpose of attaching the temporary carrier wafer 350 is to provide mechanical support when the silicon substrate 320 is removed. The silicon substrate 320 may be removed using a combination of selective wet etch, grind and/or CMP.

Figure 3C:
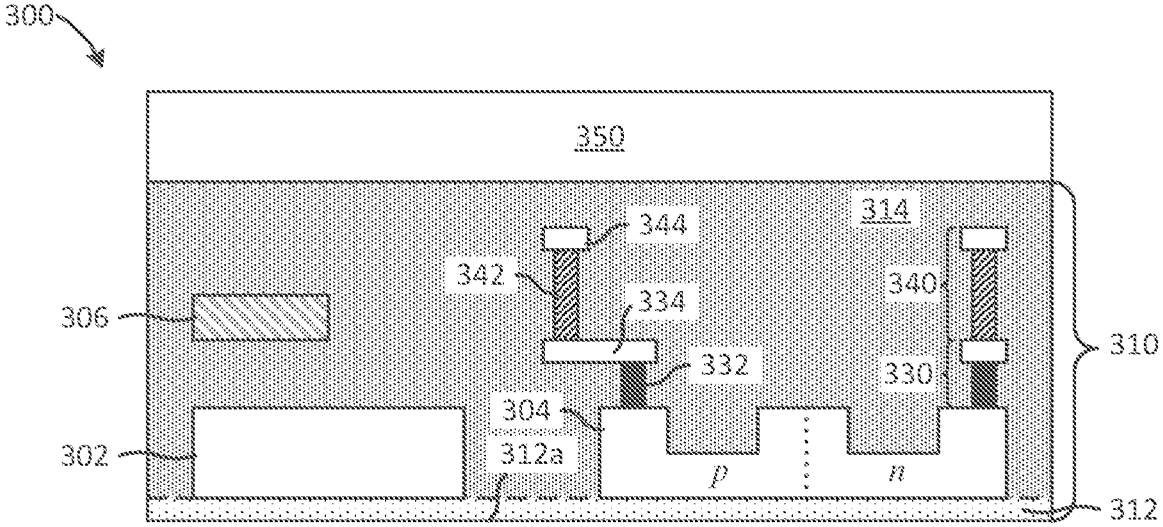

FIG. 3C illustrates a cross-sectional view of the second PIC die 300 after the silicon substrate 320 has been removed and the BOX layer 312 has been planarized to form the second planarized surface 312*a*. The BOX layer 312 may be planarized by executing a second GCIB planarization that mimics execution of the steps in the first GCIB planarization. That is, another surface topography map, for example, a second wafer map of a thickness of the second dielectric layer 310 is compiled and used to configure the GCIB etcher to perform a GCIB-LSP etch process, which is referred to as a second process. Performing the second process may planarize the second dielectric layer 310. In some embodiments, a damage layer on the second wafer may be removed by performing a second touchup etch, where the second touchup etch comprises a wet chemical etch or a CMP process. The final planarized surface of the BOX layer 312 is the second planarized surface 312*a*.

As explained in further detail below, in preparing the first planarized layer 214*a* and the second planarized layer 312*a*, the respective planarizations have to provide not only smooth surfaces with sub-nanometer root mean squared (RMS) roughness but also precisely controlled thicknesses with TTV less than 2 nm. As mentioned above, the tight thickness control is advantageous for a 3D stacked PIC, where optical signals travel by evanescent coupling between optical components.

During operation of the 3D stacked PIC die 400, optical signals may pass between the first PIC die 200 and the second PIC die 300 by evanescent coupling of light between the first waveguide 202 and the second waveguide 302. As known to persons skilled in the art, a propagating EM wave confined in the core of a dielectric waveguide by TIR is accompanied by exponentially decaying evanescent fields in the lower refractive index cover material outside the waveguide (i.e., the cladding of the waveguide). Evanescent coupling (also known as directional coupling) may occur if another waveguide is placed at such close proximity that its higher refractive index material (i.e., the core) interacts with the evanescent fields in the lower refractive index material (i.e., the cladding) separating the two waveguides. A length over which the waveguides are in close proximity is referred to as a coupling length of the optical coupler. The interaction disturbs the total internal reflection (a phenomenon known as frustrated TIR), thereby allowing EM energy to be transferred from one waveguide to excite an EM wave in the other waveguide. Thus, the optical coupler comprises not only the overlapping core region of the two waveguides but also the cladding region separating the cores along the coupling length. As expected from the exponentially decaying strength of the evanescent fields, a coupling strength of a coupler operating on this principle is sensitive to a separation distance between the two waveguides. Thus, it is desirable that the planarization processes provide precisely controlled thicknesses of the first dielectric layer 210 and the second dielectric layer 310 over the first waveguide 202 and the second waveguide 302, respectively to provide a precisely controlled separation distance between the two waveguides. In various embodiments, the thickness of the first dielectric layer 210 between the first waveguide 202 and the first planarized surface 214*a* may be from about 10 nm to about 3000 nm. Likewise, the thickness of the second dielectric layer 310 between the second waveguide 302 and the second planarized surface 312*a* may be from about 10 nm to about 3000 nm. In some embodiments, these thicknesses may be controlled within a range of about +/−0.001% to about +/−10%.

As indicated in box 150 of the flowchart in FIG. 1, the method 100 includes bonding the first planarized surface 214*a* to the second planarized surface 312*a* to form the 3D stacked PIC die 400. After preparing the first planarized surface 214*a* and the second planarized surface 312*a*, the first PIC die 200 and the second PIC die 300 may be stacked together by bonding the first planarized surface 214*a* to the second planarized surface 312*a*. The bonding couples the two dies. The 3D stacked PIC die 400, i.e., the first PIC die 200 stacked with the second PIC die 300, is described with reference to FIGS. 4A-4B. Note that in this example embodiment, the 3D stacked PIC die 400 is formed using W2W bonding. In W2W bonding, the bonding surfaces are planarized prior to singulation.

In some other embodiments, a singulated die may be bonded to a die in a wafer using D2W bonding, or a singulated die may be bonded to another singulated die using D2D bonding. In such an embodiment, the bonding surface of the individual die may be planarized either before or after the singulation. In all embodiments, the surfaces being bonded are planarized prior to bonding.

In order to form the optical coupler that couples optical signals across the boundary between the two dies of the 3D stacked PIC die 400, the first waveguide 202 has to be positioned proximate the second waveguide 302. Thus, the bonding includes aligning the first PIC die 200 with the second PIC die 300 prior to performing a bonding process that physically couples the two dies. For W2W bonding, the first wafer may be aligned to the second wafer. Thus, the placements of the plurality of first dies 200 in the first wafer has to match the placements of the plurality of second dies 300 in the second wafer such that aligning the first wafer to the second wafer results in aligned pairs of dies, each pair comprising one first die 200 and one second die 300. Of course, the placement of the first waveguide 202 in each first die 200 has to match the placement of the second waveguide 302 in each second die 300, such that aligning each first die 200 to its respective second die 300 aligns the first waveguide 202 to the second waveguide 302 over a coupling length. Note that for D2W or D2D bonding, the individual dies being bonded to form a 3D stacked die have to be aligned to each other.

With the dies aligned, bonding may be performed using a bonding process suitable for bonding the first planarized surface 214*a* to the second planarized surface 312*a*. Established bonding processes are used in the embodiments in this disclosure.

A fusion bonding process (also known as direct bonding process) may be used to bond various combinations of dielectric and semiconductor surfaces (e.g., silicon oxide to silicon oxide or silicon to silicon oxide, and the like). This bonding process is based on two clean and smooth surfaces adhering together by spontaneously formed chemical bonds without any intermediate adhesive material. Generally, the fusion bonding process requires that the bonding surfaces are smooth, i.e., RMS surface roughness is less than about 0.5 nm. The bond formation is initiated by applying pressure and, even at room temperature, bonds may start forming as soon as the surfaces are brought in atomic contact. Typically, the planarized and aligned first die and second die are pre-bonded at a low temperature and the bond strength enhanced by annealing at an elevated temperature. Without any a priori surface activation step, the anneal temperature may be very high, for example, between 700° C. to 1100° C. This is often unacceptable for pre-processed dies. A lower anneal temperature also helps reduce mechanical stress caused by thermal expansion and contraction. In order to reduce the anneal temperature, various surface pretreatments may be done to activate the surfaces to be bonded. For example, in some embodiments, a plasma pretreatment may be performed, where the first planarized surface 214*a* and the second planarized surface 312*a* may be exposed to plasma prior to aligning the first PIC die 200 with the respective second PIC die 300.

In embodiments where the bonding includes metal-to-metal and dielectric-to-dielectric bonding, a hybrid bonding process may be used. A hybrid bonding process combines the fusion bonding process with the metal diffusion bonding process (also known as thermo-compression bonding process) into one bonding process.

In the metal diffusion bonding process, two metal surfaces (e.g., Cu—Cu, Au—Au, and Al—Al) are brought into atomic contact and heat and compressive force are applied simultaneously for an extended time, during which there is a diffusion-controlled movement of material between the crystal lattices of metal grains at the interface between two metal surfaces being bonded. The bond is a result of migration of metal atoms from one crystal lattice to the other by the applied force and heat. The force brings the surfaces in closer contact with each other by increasing the contact area, for example, by asperity deformation that reduces micro-voids at the interface. The heat increases the diffusion coefficient by increasing the energy of random lattice vibrations.

Although not shown in the example embodiment in FIGS. 2 and FIGS. 3A-3C, in some embodiments where the first planarized surface 214*a* and the second planarized surface 312*a* have metal pads to be coupled together, the bonding may comprise a hybrid bonding process. As mentioned above, hybrid bonding processes provide a single bonding process for bonding two surfaces, each having a metallic portion (e.g., a copper bond pad) and a dielectric portion. One advantage of hybrid bonding is that optical and electrical couplers may be formed in a single bonding process. The bonding between the dielectric portions may be used to form optical couplers and the bonding between the metallic portions may be used to form electrical couplers.

In an example embodiment of bonding that comprises the hybrid bonding process, first a plasma pretreatment may be performed on the surfaces to be bonded. In this example embodiment of bonding, each of the surfaces to be bonded, has a metallic portion and a dielectric portion. Otherwise, the surfaces are similar to the first planarized surface 214*a* and the second planarized surface 312*a*. Next, the first die to be bonded is aligned to the second die to be bonded. With the dies aligned, the hybrid bonding process may be performed. In the hybrid bonding process, first the dielectric portions of the surfaces get pre-bonded (described above for the fusion bonding process) at a low temperature. Further heating the pre-bonded dies achieves two purposes. At the higher temperature, the fusion bond is annealed and a metal diffusion bond occurs between the metallic portions. The anneal temperature may depend on properties of the metals being bonded. Typical anneal temperatures may be between about 250° C. to about 450° C. for Au and between about 250° C. to about 400° C. for Al and Cu. It is noted that these temperatures are not very high. Generally, the range of anneal temperatures is such that surface activation using, for example, the plasma pretreatment step is desired. Typical anneal times may range from about 20 minutes to about an hour.

Figure 4A:
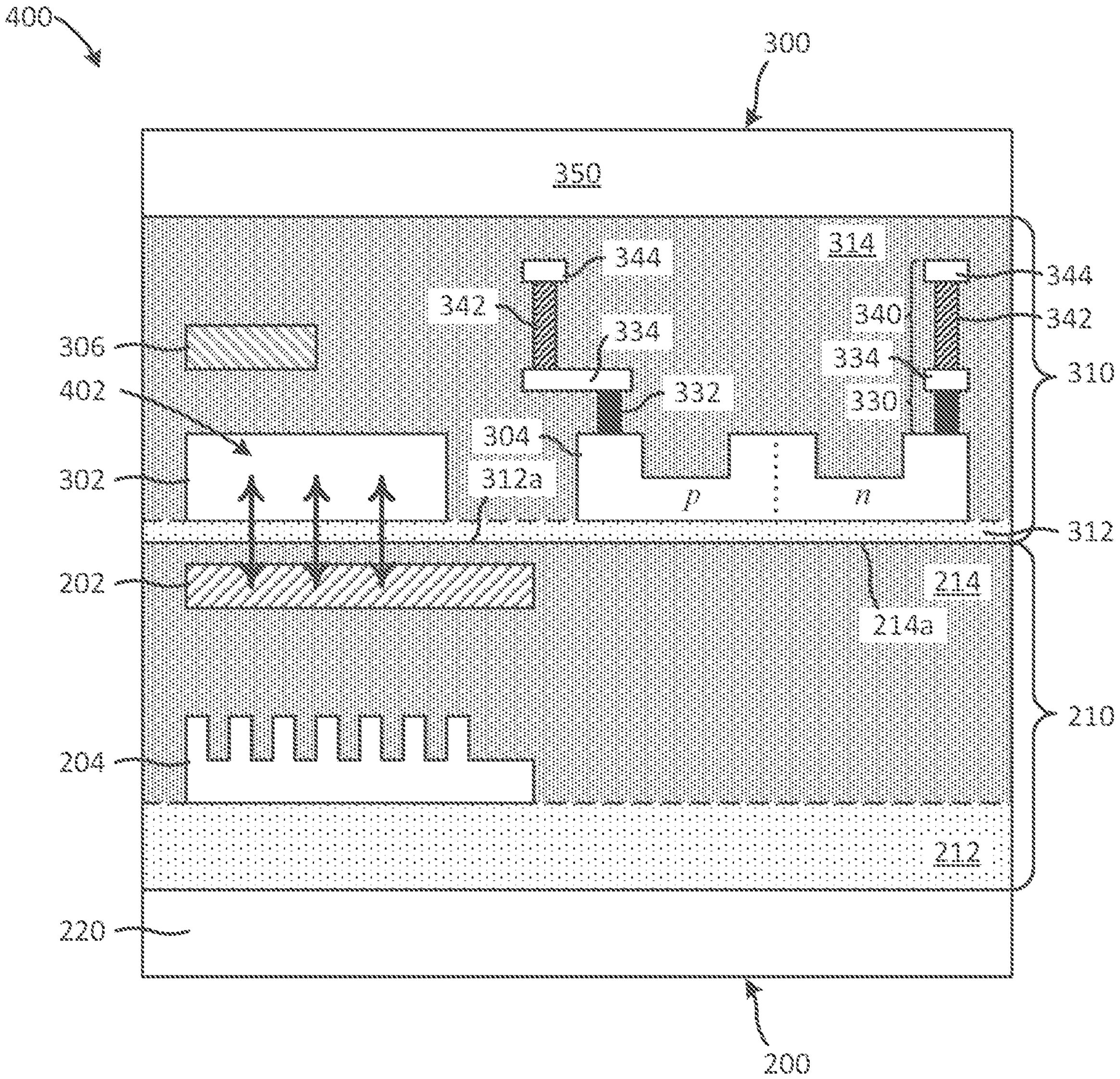
FIGS. 4A-4B illustrate various schematic cross-sectional views of a 3D stacked PIC at intermediate stages of fabrication, in accordance with an embodiment of the invention.
Figure 4B:
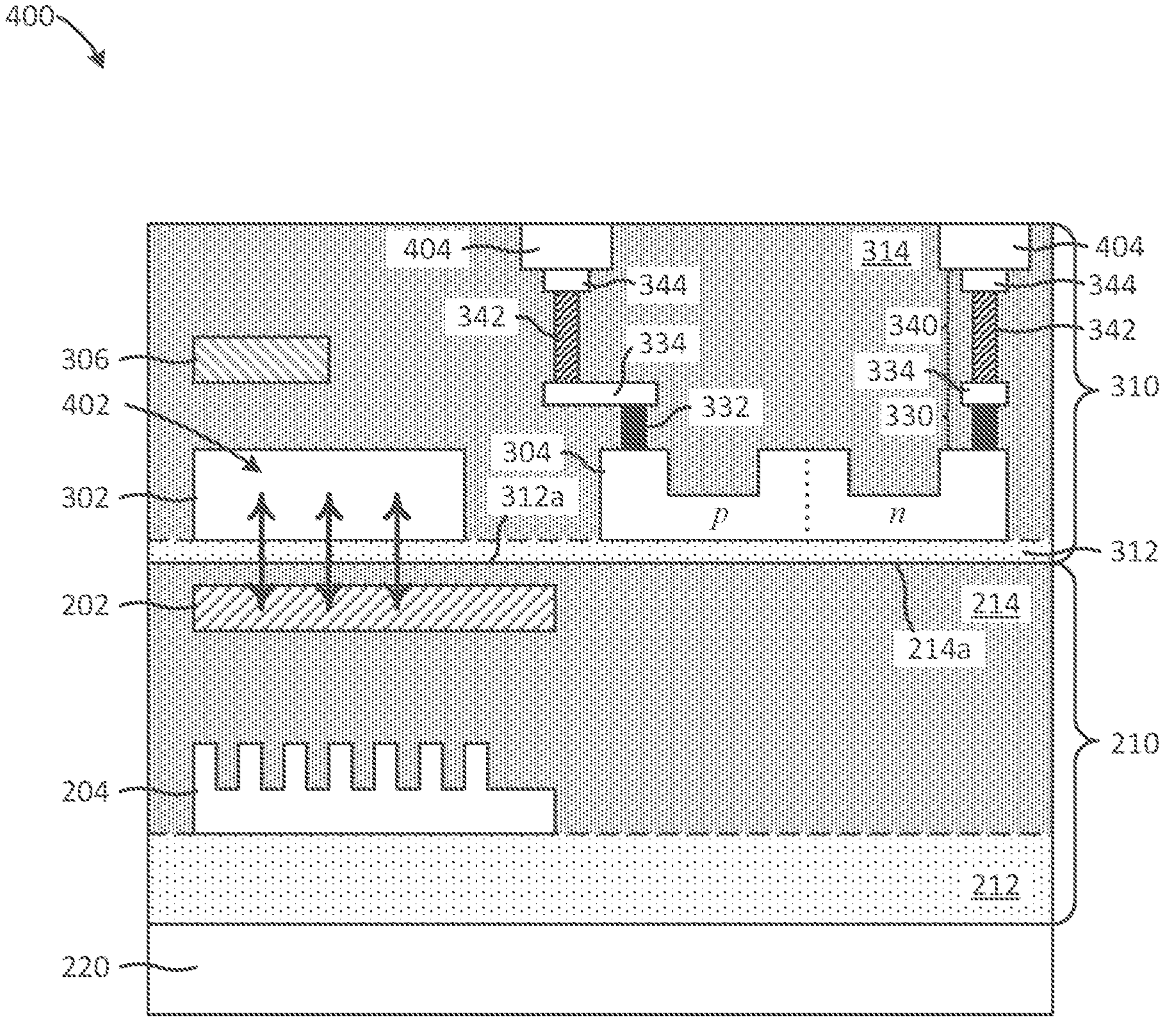

FIG. 4A illustrates a cross-sectional view of the 3D stacked PIC die 400 after the first die is bonded to the second die using the fusion bonding process to form the bonded 3D stacked PIC die 400. As illustrated in FIG. 4A, aligning the first die to the second die has aligned the first waveguide 202 to the second waveguide 302 to form the optical coupler 402 comprising an overlapping portion of the first waveguide 202 and the second waveguide 302 over a coupling length, as indicated by double arrows in FIG. 4A. The optical coupler 402, comprising the first waveguide 202 and the second waveguide 302 and the dielectric separating them, couples the first PIC die 200 to the second PIC die 300. Thus, in each 3D stacked PIC die 400, the first PIC die 200 is coupled to the second PIC die 300.

In some embodiments where W2W bonding is used to form a bonded wafer, the bonded wafer may be further processed to add an electronic, optical, or optoelectronic component, or an electrical interconnect element to each die. In the example embodiment illustrated in FIG. 4B, bond pads 404 have been added to each 3D stacked PIC die 400 after the bonding is completed. As seen in the cross-sectional view of the 3D stacked PIC dies 400 illustrated in FIG. 4B, the temporary carrier wafer 350 has been removed to form the bond pads 404, which are seen connected to respective $metal_2$ lines 344. The bond pads 404 may be used for electrical coupling.

After completing processing the bonded wafer, a singulation process may be performed to divide the bonded wafer into individual PICs, i.e., 3D stacked PIC dies 400 to be packaged.

In the example embodiment, described above with reference to FIGS. 1-4B, the W2W bonding is performed with pre-processed patterned wafers. The first wafer is bonded to the second wafer after the first PIC dies 200 and the second PIC dies 300 comprising the first waveguide 202 and the second waveguide 302, respectively, have been formed.

In some other embodiment, the bonding in method 100 may be W2W bonding, where the bonding process is performed with an unpatterned wafer and a patterned wafer. The unpatterned wafer may be patterned through a sequence of patterning levels to form various components and electrical interconnect elements. For example, the first wafer may be an SOI wafer whose epitaxial silicon layer is patterned to form first PIC dies comprising, e.g., passive optical components, covered by a dielectric layer (similar to the isolation layer 214), and planarized to form the first planarized layer. The second wafer may be an unpatterned wafer comprising, e.g., a III-V compound semiconductor layer such as an InAs epitaxial layer. Often, InAs is a preferred material for forming certain optoelectronic components, e.g., LED and diode laser. The InAs epitaxial layer may be grown over a temporary carrier wafer comprising a silicon substrate and a buffer layer deposited over the silicon substrate, where the buffer layer mitigates a lattice mismatch between silicon and InAs. The second planarized layer may be formed by planarizing a dielectric layer formed covering the InAs epitaxial layer of the second wafer. The process flows for forming the planarized layers may include GCIB planarization. After bonding the first planarized layer with the second planarized layer to form the heterogeneous bonded wafer, the bonded wafer may be processed to form second PIC dies that include optoelectronic components fabricated using the InAs epitaxial layer. The second PIC dies may be patterned aligned over the first PIC dies to form pairs of stacked PIC dies in the heterogeneous bonded wafer. Each stack comprising one first PIC die and a respective second PIC die is a heterogeneous 3D stacked PIC die. The alignment prior to bonding may be a coarse alignment because, prior to bonding, no optical component has been formed in the second wafer. However, alignment steps in patterning the InAs epitaxial layer are critical for aligning each second PIC die to its respective first PIC die in order to couple optical signals appropriately during operation of the heterogeneous 3D stacked PIC die.

In the example embodiment of method 100, described above with reference to FIGS. 1-4B, for the sake of specificity we had assumed, that the 3D stacked PIC die 400 is formed using W2W bonding. In some other embodiment, the bonded wafer comprising a plurality of 3D stacked PIC die 400 may be formed using D2W bonding. For example, after forming the first planarized surface 214*a*, the first wafer may be singulated to obtain the first PIC die 200. In general, after forming the second planarized surface 312*a*, the second wafer may be singulated to obtain the second PIC die 300. However, for D2W bonding, only one of the two wafers is singulated. Each individual die obtained from the singulation process may be aligned and attached to a die on the wafer that has not been singulated, thus forming the bonded wafer. As known to persons skilled in the art, the D2W bonding may comprise either direct placement of individual die or a collective die transfer by a reconstituted wafer. The bonded wafer may be divided into individual 3D stacked PIC dies by performing another singulation process.

It is understood, that the 3D stacked die 400 may also be formed by D2D bonding after singulation is performed on the first wafer to obtain the first PIC die 200 and on the second wafer to obtain the second PIC die 300.

In another embodiment of the invention, each 3D stacked PIC die comprises multiple stacks of two PIC dies (as opposed to a single stack of two PIC dies). The 3D stacked PIC die comprising multiple stacks, where each stack is a pair of PICs, is referred to as a 3D multi-stacked PIC die in this disclosure. Several examples of fabricating 3D multi-stacked PIC dies are described with reference to schematic cross-sectional views in FIGS. 5A-8B. In the embodiments of fabricating 3D multi-stacked PIC die described in this disclosure, one die in each pair is common to all the pairs. The common die in each stacked pair is referred to as a primary PIC die of the 3D multi-stacked PIC die. The other die of the stacked pair is referred to as a chiplet. For bonding multiple chiplets to the primary PIC die, generally, a die size of the primary PIC die has to be larger than a die size of all of the chiplets. Thus, the fabrication of the 3D multi-stacked PIC dies is not compatible with W2W bonding. The W2W bonding technique is typically used to bond dies having the same form factor. Hence, the fabrication method for 3D multi-stacked PIC die utilizes D2W or D2D bonding. Clearly, a singulation process is performed on the wafers comprising the chiplets prior to bonding.

The fact that the die size of all of the chiplets is smaller than the die size of the primary PIC die may be used advantageously to reduce a cost of fabricating the bonded 3D multi-stacked PIC die by locally planarizing a major surface of the primary die. In some embodiments of methods for forming the 3D multi-stacked PIC dies, the GCIB planarization of the primary PIC die may take advantage of the fact that optical coupling between the primary PIC die and the chiplets occur in a region of limited area. Thus, the location specific processing technique for the GCIB-LSP etch process may implement a scan trajectory that covers the limited area of the surface for exposure to the GCIB beam during the GCIB etch process. In some embodiments, the scan trajectory may comprise several discrete scan trajectories for local planarization of several non-contiguous locations. For example, each non-contiguous location may be designated for each of several chiplet dies being bonded to the primary die. One advantage of local planarization is that planarizing a first portion of a major surface and skipping a second portion of the major surface allows a reduced scan time, which leads to higher throughput and lower manufacturing cost.

Figure 5A:
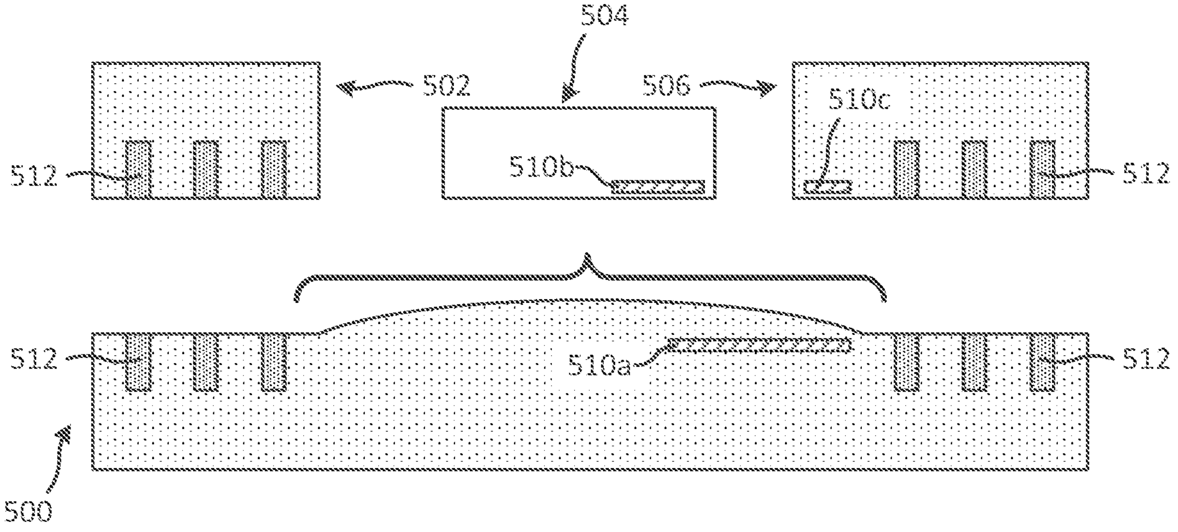
FIG. 5A illustrates a schematic cross-sectional view of a primary PIC die and three chiplets, in accordance with an embodiment of the invention.

FIG. 5A a schematic cross-sectional view of a primary PIC die 500 and three chiplets, which are to be bonded with the primary PIC die 500 to form three stacks at three different locations of the primary PIC die 500. In the example in FIG. 5A, a first chiplet 502 is an electrical IC (EIC) having no optical component, a second chiplet 504 may be a PIC having only passive optical components and referred to as a waveguide chip (WG-chip), and a third chiplet 506 may be an optoelectronic IC (OEIC). Optical coupling between the chiplets and the primary PIC die 500 may be achieved with planar waveguide optical couplers similar to the optical coupler 402, described above with reference to FIG. 4A. The waveguide 510*a* in the primary PIC die 500 and the waveguides 510*b* and 510*c* in the first chiplet 504 and the second chiplet 506, respectively, may be used as parts of two optical couplers. Electrical coupling between the chiplets and the primary PIC die 500 may be achieved using conductive plugs 512 that connect to electrical coupling elements such as conductive bond pads (not shown). In some embodiments, the electrical couplers are formed during the bonding process (e.g., the hybrid bonding process described above).

Similar to the optical coupler 402 (described above with reference to FIG. 4A), the bonding of a pair of planarized dielectric surfaces may be used to form the optical couplers. In this embodiment, GCIB planarization is applied locally, focusing on the regions of the primary die where high degree of planarity and thickness control may be needed for forming optical couplers. In FIG. 5A, the region of a surface of the primary PIC die 500 designated for GCIB planarization is indicated by a bracket. Thus, in this embodiment, the location specific processing technique for the GCIB-LSP etch process is used not only by implementing beam location dependent etch rates for planarization but also by implementing a scan trajectory that covers a limited area of the surface for exposure to the GCIB beam during the GCIB etch process. As mentioned above, one advantage of this approach is a reduced scan time, which leads to higher throughput and lower manufacturing cost.

In some embodiments, regions of the surfaces of the second chiplet 504 and the third chiplet 506 proximate the waveguides 510*b* and 510*c*, respectively, may also be designated for GCIB planarization.

After planarization, the first chiplet 502, the second chiplet 504, and the third chiplet 506 are bonded to the primary PIC die 500. The bonding may be, for example, D2W bonding using a collective die transfer by a reconstituted wafer or by direct placement of chiplets. Note that D2W bonding to form multiple stacks implies performing a bonding process for each stack of the multiple stacks. The wafers comprising the chiplets may be coated with a protection layer over the surface to be bonded prior to singulation by dicing. In a collective die transfer D2W bonding, the singulated dies with the protection layer are placed on a collective die carrier wafer and the protective layer removed by a solvent. As mentioned above, in preparation for a low temperature bonding process, a plasma pretreatment may be performed. The carrier wafer comprising the singulated chiplets (e.g., chiplets 502) may then be aligned to a wafer comprising the primary PIC dies 500 in order to align the chiplets to the primary PIC dies 500. After alignment, a fusion, metal diffusion, or hybrid bonding process may be performed and the collective die carrier released using a suitable debonding technique (e.g., laser debonding or thermal lift-off debonding).

Figure 5B:
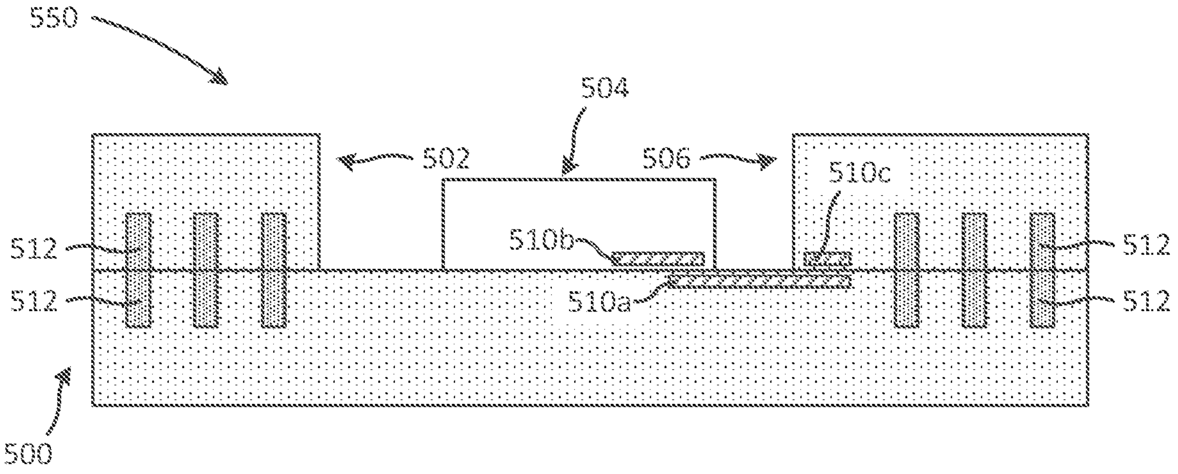
FIG. 5B illustrates a schematic cross-sectional view of a bonded PIC die comprising the three chiplets in FIG. 5A bonded to the locally planarized primary PIC die, in accordance with an embodiment of the invention.

It is noted that the D2W (or D2D) bonding comprises performing aligning the dies in each stack and performing a bonding process to couple the aligned dies of each stack, hence multiple alignment and bonding processes are performed to form multiple stacks FIG. 5B illustrates a schematic cross-sectional view of a bonded PIC die, which is the 3D multi-stacked PIC die 550. As illustrated in FIG. 5B, the first chiplet 502, which is an EIC, is electrically coupled to the primary PIC die 500 (an OEIC) using conductive plugs 512 and conductive bond pads (not shown). The second chiplet 504 is optically coupled to the locally planarized primary PIC die 500 by coupling between an overlapping length of the waveguide 510*a* and the waveguide 510*b*. The third chiplet 506, which is an OEIC, is coupled to the primary die 500 both optically (by overlapping waveguides 510*a* and 510*c*) and electrically using conductive plugs 512 and conductive bond pads (not shown).

Three more example embodiments of this method of fabricating 3D multi-stacked PIC die are described below with reference to FIGS. 6A-8B.

Figure 6A:
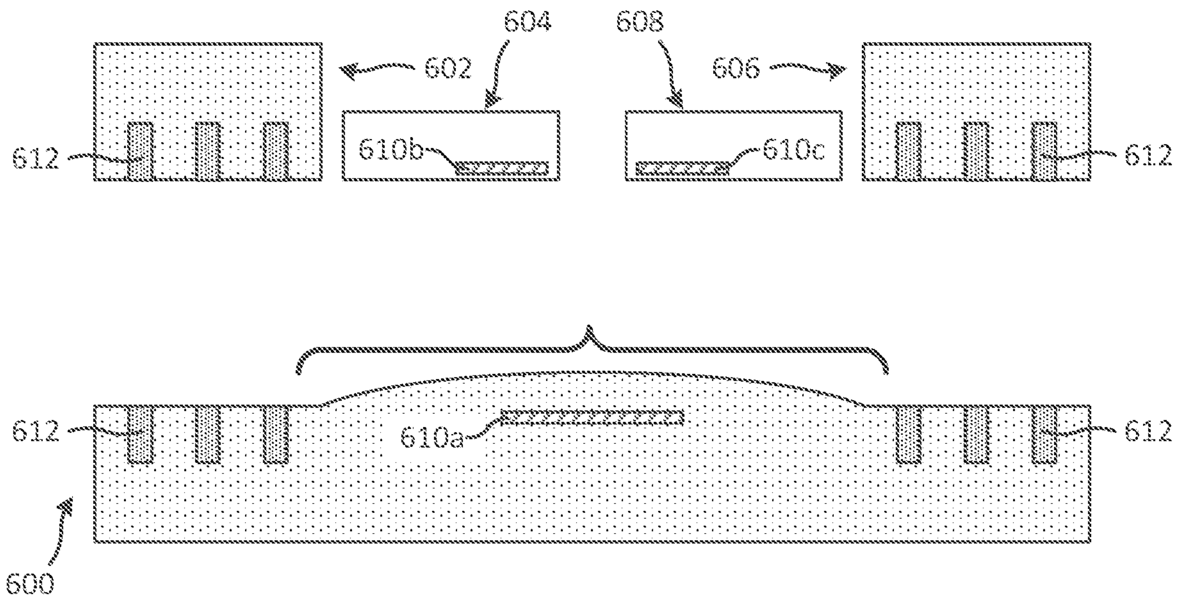
FIG. 6A illustrates a schematic cross-sectional view of a primary PIC die and four chiplets, in accordance with an embodiment of the invention.

FIG. 6A illustrates a schematic cross-sectional view of four chiplets to be bonded to a primary PIC die 600. Of the four chiplets, a first chiplet 602 and a second chiplet 606 are EICs, and a third chiplet 604 and a fourth chiplet 608 are WG-chips. The primary PIC die 600 is an OEIC. A region designated for GCIB planarization (indicated by a bracket in FIG. 6A) comprises an area where optical couplers will be formed by bonding the chiplets to the primary PIC die 600. Similar to the embodiment described above with reference to FIGS. 5A-5B, in this embodiment, the GCIB-LSP etch process is implementing a scan trajectory that covers a limited area of the surface for exposure to the GCIB beam during the GCIB etch process.

Figure 6B:
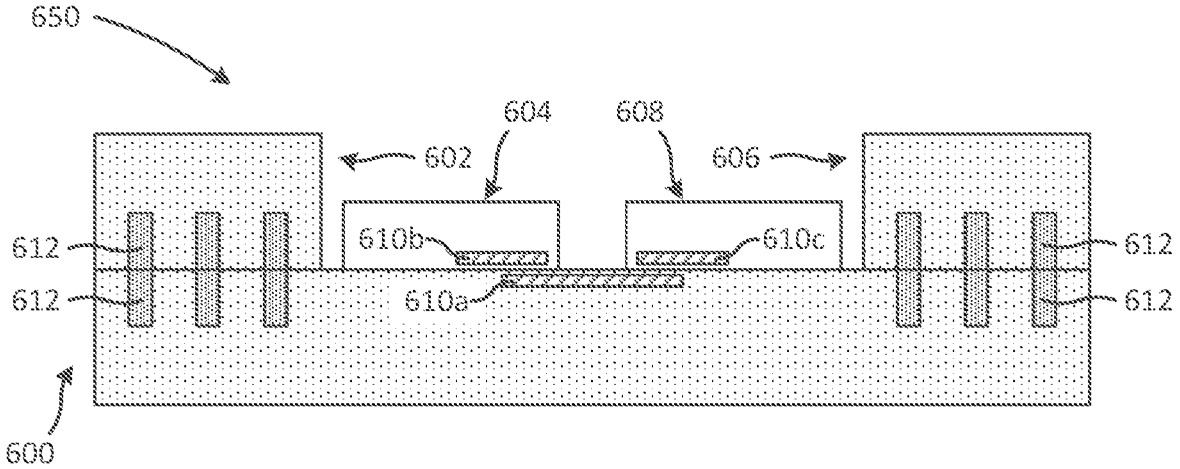
FIG. 6B illustrates a schematic cross-sectional view of a bonded PIC die comprising the four chiplets in FIG. 6A bonded to the locally planarized primary PIC die, in accordance with an embodiment of the invention.

FIG. 6B illustrates a schematic cross-sectional view of a bonded PIC die, which is the 3D multi-stacked PIC die 650. Optical coupling between the locally planarized primary PIC die 600 (an OEIC) and the WG-chips (i.e., the third chiplet 604 and the fourth chiplet 608) is achieved by the overlapping portions of waveguides 610*a*, 610*b*, and 610*c*, and electrical coupling between the primary PIC die 600 and the EIC (i.e., the first chiplet 602 and the second chiplet 606) is achieved by conductive plugs 612 and conductive bond pads (not shown).

Figure 7A:
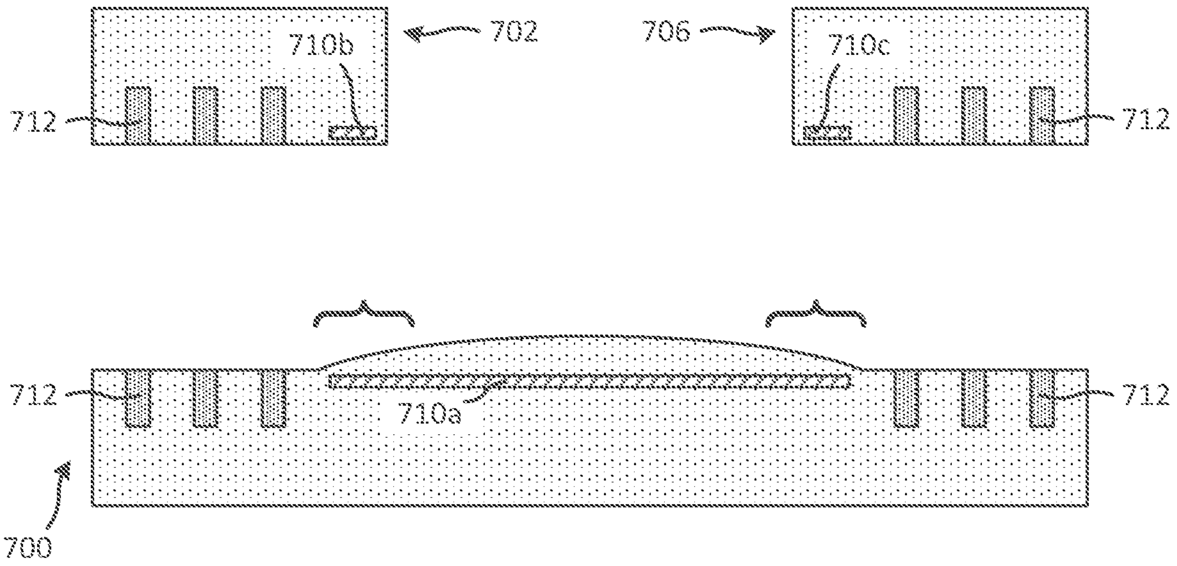
FIG. 7A illustrates a schematic cross-sectional view of a primary PIC die and two chiplets, in accordance with an embodiment of the invention.

FIG. 7A illustrates a schematic cross-sectional view of two chiplets to be bonded to a primary PIC die 700. The primary PIC die 700, a first chiplet 702, and a second chiplet 706 are all OEICs. In this embodiment, a region comprising two separate areas is designated for GCIB planarization. Each of the two areas is indicated by a bracket in FIG. 7A and comprises an area where optical couplers will be formed by bonding the chiplets to the primary PIC die 700.

Figure 7B:
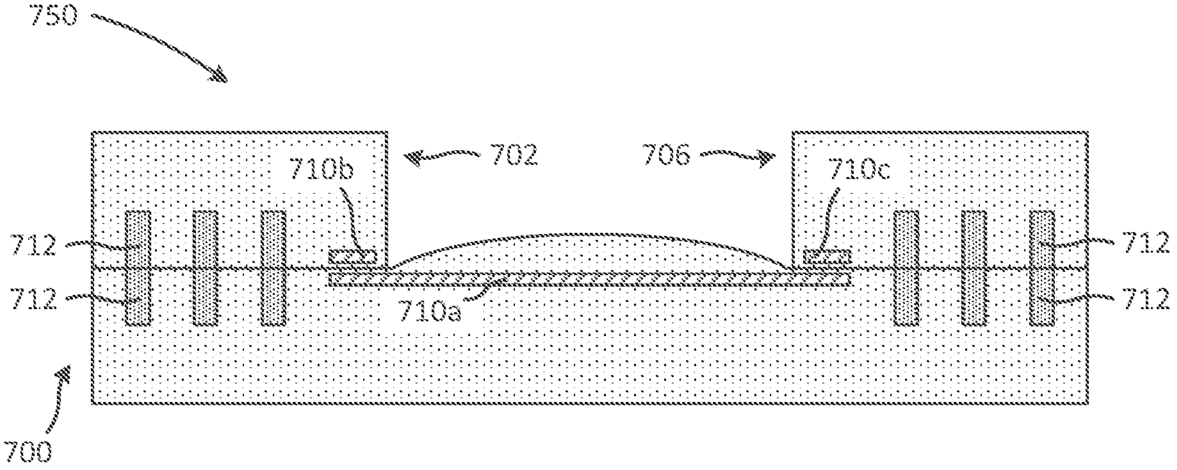
FIG. 7B illustrates a schematic cross-sectional view of a bonded PIC die comprising the two chiplets in FIG. 7A bonded to the locally planarized primary PIC die, in accordance with an embodiment of the invention.

Note that, unlike in the previous embodiments (described above with reference to FIGS. 5A-5B and FIGS. 6A-6B), in the example in FIGS. 7A-7B, the scan trajectory for the GCIB-LSP etch process comprises two independent scan trajectories. A first scan trajectory may be used for GCIB planarization of the area indicated by the bracket on the left side in FIG. 7A and second scan trajectory may be used for GCIB planarization of the area indicated by the bracket on the right side in FIG. 7A.

FIG. 7B illustrates a schematic cross-sectional view of a bonded PIC die, which is the 3D multi-stacked PIC die 750. Note that the area on the left which was designated for GCIB planarization by a bracket in FIG. 7A is where a waveguide 710*b* in the first chiplet 702 overlaps with a waveguide 710*a* in the locally planarized primary PIC die 700, and the area on the right which was designated for GCIB planarization by another bracket in FIG. 7A is where a waveguide 710*c* in the second chiplet 706 overlaps with a waveguide 710*a* in the locally planarized primary PIC die 700. Electrical coupling between the primary PIC die 700 and the first chiplet 702, as well as that between the primary PIC die 700 and the second chiplet 706 are achieved by conductive plugs 712 and conductive bond pads (not shown).

Figure 8A:
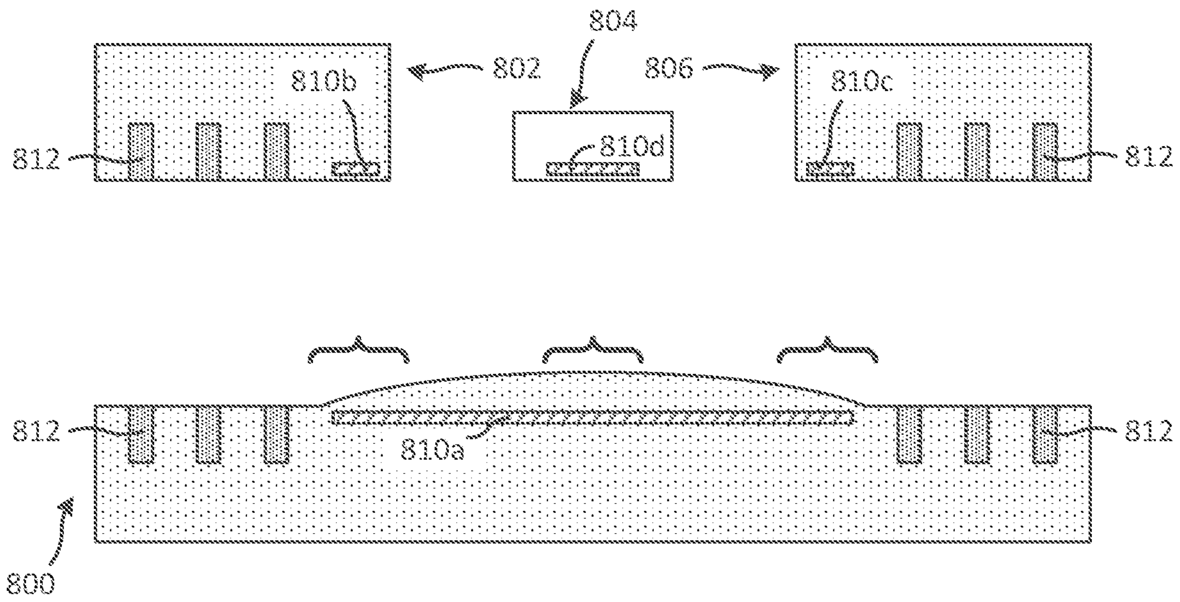
FIG. 8A illustrates a schematic cross-sectional view of a primary PIC die and three chiplets, in accordance with an embodiment of the invention.

FIG. 8A illustrates a schematic cross-sectional view of three chiplets to be bonded to a primary PIC die 800. The primary PIC die 800, a first chiplet 802, and a second chiplet 806 are OEICs. The third chiplet 804 is a WG-chip. In this embodiment, a region comprising three separate areas is designated for GCIB planarization. Each of the three areas is indicated by a bracket in FIG. 8A and comprises an area where optical couplers will be formed by bonding the chiplets to the primary PIC die 800.

Figure 8B:
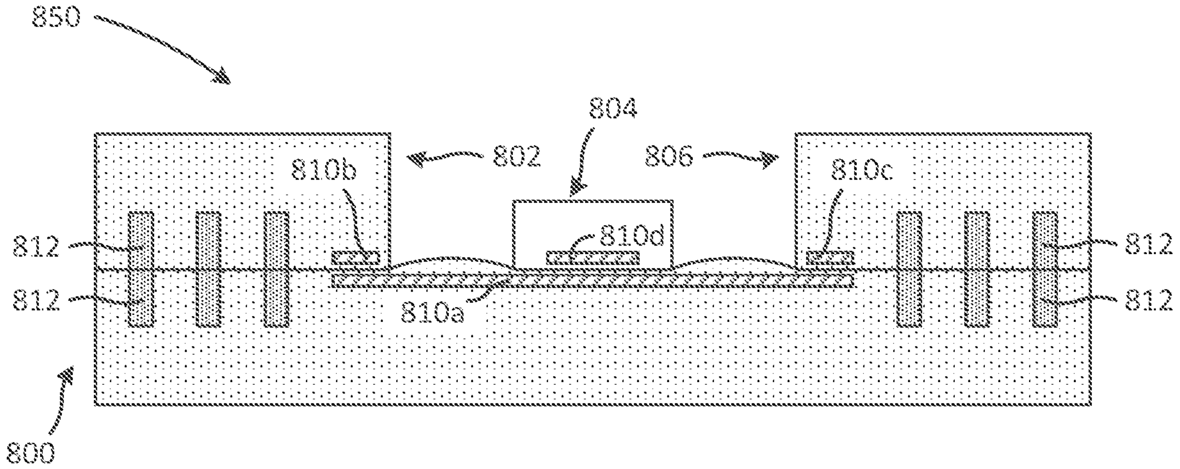
FIG. 8B illustrates a schematic cross-sectional view of a bonded PIC die comprising the three chiplets in FIG. 8A bonded to the locally planarized primary PIC die, in accordance with an embodiment of the invention.

Similar to the previous embodiment (described above with reference to FIGS. 7A-7B), the GCIB-LSP etch process for the example in FIGS. 8A-8B has combined more than one independent scan trajectories in its scan trajectory. A first scan trajectory may be used for GCIB planarization of the area indicated by the bracket on the left side in FIG. 8A, a second scan trajectory may be scanning the GCIB beam over the area indicated by the bracket on the right side in FIG. 8A, and a third scan trajectory may be used to cover the area indicated by the bracket in the center of FIG. 8A.

FIG. 8B illustrates a schematic cross-sectional view of a bonded PIC die, which is the 3D multi-stacked PIC die 850.

Note that the area on the left which was designated for GCIB planarization by a bracket in FIG. 8A is where a waveguide 810*a* in the locally planarized primary PIC die 800 overlaps with a waveguide 810*b* in the first chiplet 802. Likewise, the waveguide 810*a* in the locally planarized primary PIC die 800 overlaps with a waveguide 810*c* in the second chiplet 806, and with a waveguide 810*d* in the third chiplet 804. Electrical coupling (between the primary PIC die 800 and the first chiplet 802 and the second chiplet 806) is achieved by conductive plugs 812 and conductive bond pads (not shown).

In yet another method utilizing GCIB planarization to fabricate a PIC, a recessed planarized surface is formed in a first PIC die, and a second PIC die is bonded to the recessed planarized surface of the first PIC die to form a recessed stack. The GCIB etch process may use the LSP technique to form a recess having a planarized bottom surface. Clearly, the first PIC die has a die size larger than a die size of the second PIC die. Hence, the bonding is D2W or D2D bonding, and a singulation process has to be performed on all wafers comprising the second die. Generally, the bonding comprises aligning the first PIC die and second PIC die, and performing a bonding process to couple the aligned dies.

The first PIC die may have a first waveguide proximate the recessed planarized surface and the second PIC die may have a second waveguide. Forming the recessed stack forms a 3D stacked PIC die (referred to as a 3D recessed stacked PIC die in this disclosure). The 3D recessed stacked PIC die may have an optical coupler comprising an overlapping portion of the first waveguide and the second waveguide.

In some embodiments, the GCIB planarization may comprise performing a two-step GCIB etch process. A first step of the two-step GCIB-LSP etch process may be a location specific GCIB etch step that uses LSP to planarize a region designated for GCIB planarization. The first step is similar to the GCIB planarization described above for fabricating the example embodiments of 3D multi-stacked PIC dies in FIGS. 5A-8B. A second step of the two-step GCIB-LSP etch process may be a location specific GCIB etch step that uses LSP to recess a portion of the region planarized in the first step. In some embodiments, the recess may be formed by the first location specific GCIB etch step and then the recessed surface planarized by the second location specific GCIB etch step of the two-step GCIB etch process.

In some other embodiments, the location specific scan rates may be configured to form the recessed planarized surface in a single GCIB-LSP etch step.

Figure 9A:
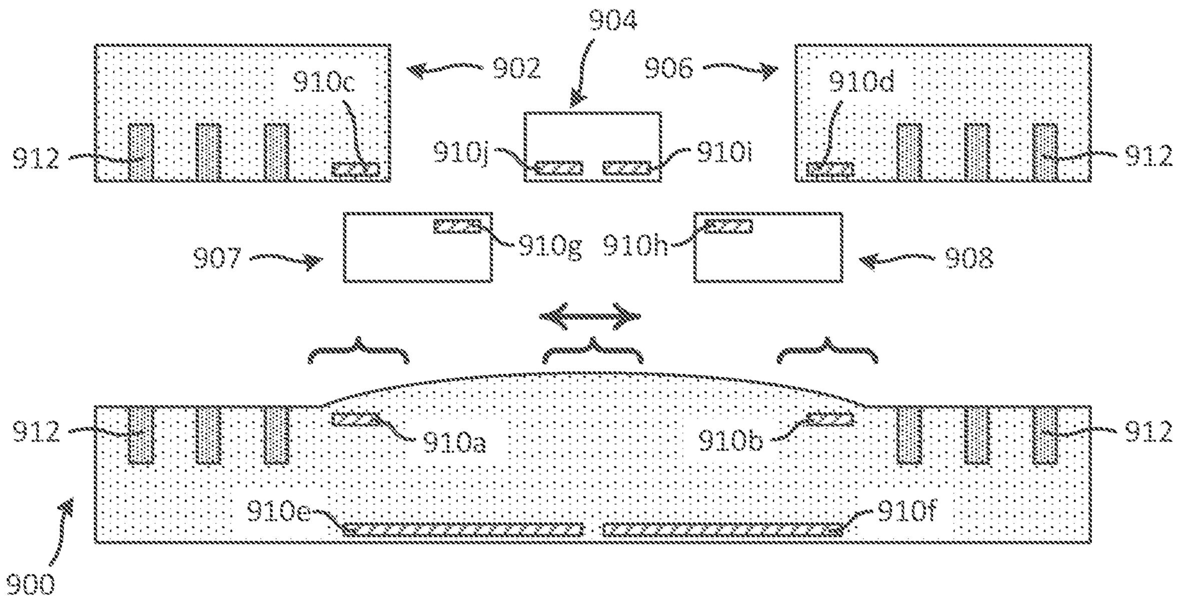
FIG. 9A illustrates a schematic cross-sectional view of a primary PIC die and three chiplets, in accordance with an embodiment of the invention.
Figure 9B:
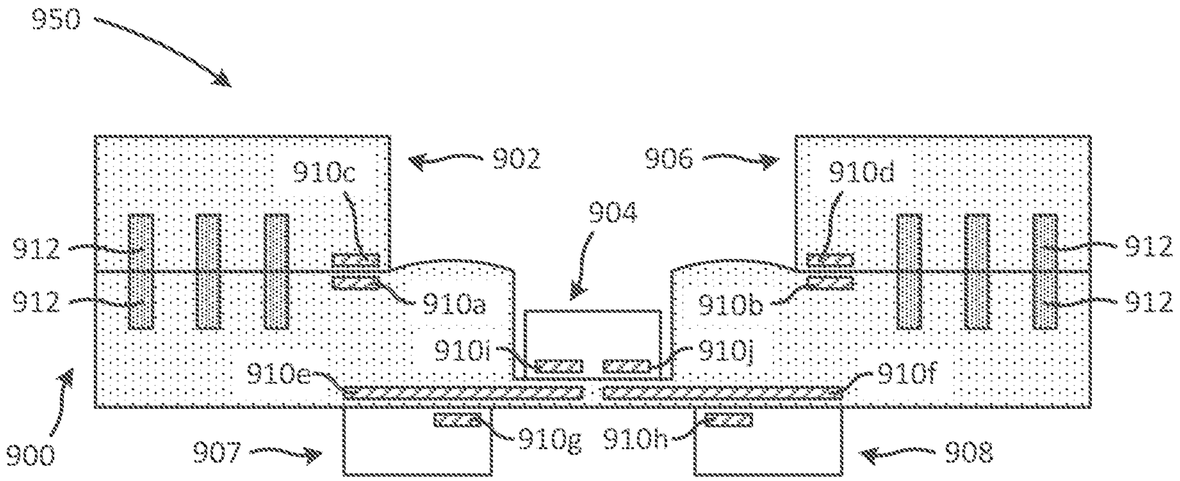
FIG. 9B illustrates a schematic cross-sectional view of a bonded PIC die comprising the three chiplets in FIG. 9A bonded to the locally planarized primary PIC die, in accordance with an embodiment of the invention.

As illustrated in FIGS. 9A and 9 B, this method may be used to form a multi-stacked PIC die comprising a recessed stack. One advantage provided by forming recessed stacks in a multi-stacked PIC die is that it provides an option of coupling waveguides of a chiplet to either one of two different levels in the primary PIC die, as illustrated in FIGS. 9A-9B.

FIG. 9A illustrates a schematic cross-sectional view of five chiplets to be bonded to a primary PIC die 900. A first chiplet 902, a second chiplet 906, and the primary PIC die 900 are OEICs, whereas a third chiplet 904, a fifth chiplet 907, and a sixth chiplet 908 are WG-chips. In this embodiment, a region comprising three separate areas is designated for GCIB planarization. Each of the three areas is indicated by a bracket in FIG. 9A and comprises an area where optical couplers will be formed by bonding the chiplets to the primary PIC die 900. A double arrow over the bracket in the center of FIG. 9A indicates that the area under the double arrow is designated for a location specific GCIB etch process to form a recessed planarized surface, recessed below the planarized surfaces formed under the bracket to the left and the bracket to the right.

FIG. 9B illustrates a schematic cross-sectional view of a bonded PIC die, which is the 3D multi-stacked PIC die 950 having five stacks comprising the five chiplets and the primary PIC die illustrated in FIG. 9A. As illustrated in FIG. 9B, the primary PIC die 900 has waveguides at two levels. Waveguides 910*a* and 910*b* are at an upper level and waveguides 910*e* and 910*f* are at a lower level.

In FIG. 9B, there are two stacks formed at the upper level. Waveguide 910*a* is seen overlapping with waveguide 910*c*, thus optically coupling the first chiplet 902 to the primary PIC die 900 in a first stack of the 3D multi-stacked PIC die 950. A second stack of the 3D multi-stacked PIC die 950 comprises the primary PIC die 900 and the second chiplet 906. Waveguide 910*b* at the upper level of the primary PIC die 900 and waveguide 910*d* of the second chiplet 906 are overlapping to form an optical coupler coupling the pair of the second stack.

At the lower level of the 3D multi-stacked PIC die 950, there is a recessed stack comprising the primary PIC die 900 and the third chiplet 904. As illustrated in FIG. 9B, waveguides 910*i* and 910*j* of the third chiplet 904 have overlaps with waveguides 910*e* and 910*f*, respectively of the primary PIC die 900. The overlapping portions of waveguides 910*e* and 910*i* and the overlapping portions of waveguides 910*f* and 910*j* form two optical couplers coupling the third chiplet 904 to the primary PIC die 900 of the recessed stack.

In addition, there are two stacks formed by bonding the primary PIC die 900 to the fourth chiplet 907 and the fifth chiplet 908. The bonding surface of the primary PIC die 900 for these two stacks is on a side opposite the bonding surface of the primary PIC die 900 used for the three other stacks of the 3D multi-stacked PIC die 950.

In the embodiment described above with reference to FIGS. 9A and 9B, GCIB-LSP is used to form the recess, in which the third chiplet 904 is disposed. In some other embodiment, the recess may be patterned using a suitable lithography process and masked etch such as anisotropic reactive ion etch (RIE). The bottom surface of the recess may then be planarized by a GCIB-LSP step prior to bonding.

Example embodiments of the invention are described below. Other embodiments can also be understood from the entirety of the specification as well as the claims filed herein.

Example 1. A method for fabricating a photonic integrated circuit (PIC), where the method includes providing a first PIC die including a first optical component covered by a first dielectric layer; performing a location specific ion beam planarizing of the first dielectric layer to form a first planarized surface; providing a second PIC die including a second optical component covered by a second dielectric layer; performing a planarizing of the second dielectric layer to form a second planarized surface; and bonding the first planarized surface of the first PIC die to the second planarized surface of the second PIC die to form a three dimensional (3D) stacked PIC die.

Example 2. The method of example 1, where performing the location specific ion beam planarizing includes performing location specific gas cluster ion beam planarizing.

Example 3. The method of one of examples 1 or 2, further including: performing a singulation process to form the first PIC die prior to performing the location specific ion beam planarizing.

Example 4. The method of one of examples 1 to 3, where the bonding is a die-to-die bonding, wafer-to-wafer bonding, or die-to-wafer bonding.

Example 5. The method of one of examples 1 to 4, where bonding the first planarized surface to the second planarized surface includes: before the bonding, aligning the first PIC die to the second PIC die to align the first optical component of the first PIC die to the second optical component of the second PIC die; and where the 3D stacked PIC die includes an optical coupler coupling the first PIC die to the second PIC die, the optical coupler including a portion of the first optical component of the first PIC die and a portion of the second optical component of the second PIC die.

Example 6. The method of one of examples 1 to 5, where the first planarized surface includes a first metallic portion and a first dielectric portion; where the second planarized surface includes a second metallic portion and a second dielectric portion; and where performing the bonding includes performing a hybrid bonding process attaching the first metallic portion with the second metallic portion and the first dielectric portion with the second dielectric portion.

Example 7. The method of one of examples 1 to 6, where performing the location specific ion beam planarizing includes: compiling a first die map of a thickness of the first dielectric layer; configuring an ion beam etcher to perform a first process, the first process having a beam location dependent etch rate of the first dielectric layer, the etch rate based on the first die map; and performing the first process to remove a portion of the first dielectric layer.

Example 8. The method of one of examples 1 to 7, where configuring the ion beam etcher to perform a first process includes configuring a scanner of the ion beam etcher to have a beam location dependent scan rate, the scan rate correlating directly with the respective thickness in the first die map.

Example 9. The method of one of examples 1 to 8, further including: performing a touchup etch to remove a damage layer formed during the ion beam planarization, the touchup etch including a wet etch or a chemical mechanical polish (CMP) process.

Example 10. The method of one of examples 1 to 9, where, after planarizing, a total thickness variation (TTV) of a thickness of the first dielectric layer covering the first optical component is less than 2 nm and greater than 0.5 nm; and where, after planarizing, a TTV of a thickness of the second dielectric layer covering the second optical component is less than 2 nm and greater than 0.5 nm.

Example 11. The method of one of examples 1 to 10, where the first optical component is a first waveguide and the second optical component is a second waveguide.

Example 12. The method of one of examples 1 to 11, where bonding the first planarized surface to the second planarized surface forms an optical coupler including an overlapping portion of the first optical component and the second optical component.

Example 13. A method of fabricating a photonic integrated circuit (PIC), where the method includes providing a first die and a second die, the first die being larger than the second die; locally planarizing a portion of a major surface of the first die with an ion beam to form a planarized surface, the locally planarizing including scanning the portion of the major surface relative to the ion beam; and bonding the planarized surface of the first die with a major surface of the second die.

Example 14. The method of example 13, further including planarizing a major surface of the second die prior to the bonding, where planarizing the major surface of the second die includes performing a location specific ion beam planarizing of the major surface of the second die.

Example 15. The method of one of examples 13 or 14, where the location specific ion beam planarizing includes gas cluster ion beam planarizing.

Example 16. The method of one of examples 13 to 15, where the first die includes a first optical component and the second die includes a second optical component; and where the planarized surface includes a surface of the first optical component.

Example 17. The method of one of examples 13 to 16, where bonding the planarized surface to the second die forms an optical coupler including an overlapping portion of the first optical component and the second optical component.

Example 18. The method of one of examples 13 to 17, where the bonding includes performing a fusion bonding process, metal diffusion bonding process, or hybrid bonding process.

Example 19. The method of one of examples 13 to 18, where the locally planarizing including obtaining a surface topography map of the portion of the major surface of the first die and based on the surface topography map setting a scan rate of the ion beam to obtain the planarized surface.

Example 20. A method of fabricating an integrated circuit (IC), where the method includes providing a first die and a second die, the first die being larger than the second die; performing a location specific ion beam process to form a recess into a major surface of the first die, the performing including scanning a portion of the major surface relative to the ion beam to form the recess having a planarized bottom surface; and attaching the second die to the planarized bottom surface of the recess.

Example 21. The method of example 20, where performing includes forming an opening with a lithographic process.

Example 22. The method of one of examples 20 or 21, where performing the ion beam process includes performing gas cluster ion beam process.

Example 23. The method of one of examples 20 to 22, where the first die includes a first optical component and the second die includes a second optical component, the planarized bottom surface including a surface of the first optical component.

Example 24. The method of one of examples 20 to 23, where the attaching forms an optical coupler including an overlapping portion of the first optical component and the second optical component.

Example 25. The method of one of examples 20 to 24, where performing the ion beam includes obtaining a surface topography map of the portion of the major surface of the first die and based on the surface topography map setting a scan rate of the ion beam to obtain a planarized surface; and recessing the planarized surface to form the recess with the planarized bottom surface.

What is claimed is:

1. A method for fabricating a photonic integrated circuit (PIC), the method comprising:

providing a first PIC die comprising a first optical component covered by a first dielectric layer;

performing a location specific ion beam planarizing of the first dielectric layer to form a first planarized surface;

providing a second PIC die comprising a second optical component covered by a second dielectric layer;

performing planarizing of the second dielectric layer to form a second planarized surface;

performing a touchup etch to remove a damage layer formed during the ion beam planarization, the touchup etch comprising a wet etch or a chemical mechanical polish (CMP) process; and bonding the first planarized surface of the first PIC die to the second planarized surface of the second PIC die to form a three dimensional (3D) stacked PIC die.

2. The method of claim 1, wherein performing the location specific ion beam planarizing comprises performing location specific gas cluster or reactive ion beam planarizing.

3. The method of claim 1, further comprising:

performing a singulation process to form the first PIC die prior to performing the location specific ion beam planarizing.

4. The method of claim 1, wherein the bonding is a die-to-die bonding, wafer-to-wafer bonding, or die-to-wafer bonding.

5. The method of claim 1, wherein bonding the first planarized surface to the second planarized surface comprises:

before the bonding, aligning the first PIC die to the second PIC die to align the first optical component of the first PIC die to the second optical component of the second PIC die; and wherein the 3D stacked PIC die comprises an optical coupler coupling the first PIC die to the second PIC die, the optical coupler comprising a portion of the first optical component of the first PIC die and a portion of the second optical component of the second PIC die.

6. The method of claim 5, wherein the first planarized surface comprises a first metallic portion and a first dielectric portion;

wherein the second planarized surface comprises a second metallic portion and a second dielectric portion; and wherein performing the bonding comprises performing a hybrid bonding process for attaching the first metallic portion with the second metallic portion and the first dielectric portion with the second dielectric portion.

7. The method of claim 1, wherein performing the location specific ion beam planarizing comprises:

compiling a first die map of a thickness of the first dielectric layer;

configuring an ion beam etcher to perform a first process, the first process having a beam location dependent etch rate of the first dielectric layer, the etch rate based on the first die map; and performing the first process to remove a portion of the first dielectric layer.

8. The method of claim 7, wherein configuring the ion beam etcher to perform a first process comprises configuring a scanner of the ion beam etcher to have a beam location dependent scan rate, the scan rate correlating directly with the respective thickness in the first die map.

9. The method of claim 1, wherein, after planarizing, a total thickness variation (TTV) of a thickness of the first dielectric layer covering the first optical component is less than 2 nm and greater than 0.5 nm; and wherein, after planarizing, a TTV of a thickness of the second dielectric layer covering the second optical component is less than 2 nm and greater than 0.5 nm.

10. The method of claim 1, wherein the first optical component is a first waveguide and the second optical component is a second waveguide.

11. The method of claim 1, wherein bonding the first planarized surface to the second planarized surface forms an optical coupler comprising an overlapping portion of the first optical component and the second optical component.

12. A method comprising:

providing a first die and a second die, the first die being larger than the second die;

locally planarizing a portion of a major surface of the first die with an ion beam to form a planarized surface, the locally planarizing comprising scanning the portion of the major surface relative to the ion beam, wherein the locally planarizing comprises obtaining a surface topography map of the portion of the major surface of the first die and based on the surface topography map setting a scan rate of the ion beam to obtain the planarized surface; and bonding the planarized surface of the first die with a major surface of the second die.

13. The method of claim 12, further comprising planarizing a major surface of the second die prior to the bonding, wherein planarizing the major surface of the second die comprises performing a location specific ion beam planarizing of the major surface of the second die.

14. The method of claim 13, wherein the location specific ion beam planarizing comprises gas cluster or reactive ion beam planarizing.

15. The method of claim 12, wherein the first die comprises a first optical component and the second die comprises a second optical component; and wherein the planarized surface comprises a surface of the first optical component.

16. The method of claim 15, wherein bonding the planarized surface to the second die forms an optical coupler comprising an overlapping portion of the first optical component and the second optical component.

17. The method of claim 12, wherein the bonding comprises performing a fusion bonding process, a metal diffusion bonding process, or hybrid bonding process.

18. The method of claim 12, wherein locally planarizing further comprises:

compiling a first die map of a thickness of a dielectric layer on the first die;

configuring an ion beam etcher to perform a first process, the first process having a beam location dependent etch rate of the dielectric layer, the etch rate based on the first die map; and performing the first process to remove a portion of the dielectric layer.

19. A method of fabricating an integrated circuit (IC), the method comprising:

providing a first die and a second die, the first die being larger than the second die;

performing a location specific ion beam process to form a recess into a major surface of the first die, the performing comprising scanning a portion of the major surface relative to an ion beam to form the recess having a planarized bottom surface; and attaching the second die to the planarized bottom surface of the recess.

20. The method of claim 19, wherein performing comprises forming an opening with a lithographic process.

21. The method of claim 19, wherein performing the ion beam process comprises performing gas cluster or reactive ion beam process.

22. The method of claim 19, wherein the first die comprises a first optical component and the second die comprises a second optical component, the planarized bottom surface comprising a surface of the first optical component.

23. The method of claim 22, wherein the attaching forms an optical coupler comprising an overlapping portion of the first optical component and the second optical component.

24. The method of claim 19, wherein performing the location specific ion beam process comprises obtaining a surface topography map of the portion of the major surface of the first die and based on the surface topography map setting a scan rate of the ion beam to obtain a planarized surface; and recessing the planarized surface to form the recess with the planarized bottom surface.

* * * * *